US009747325B2

(12) United States Patent
Jolly et al.

(10) Patent No.: US 9,747,325 B2
(45) Date of Patent: Aug. 29, 2017

(54) DUPLICATE STATION DETECTION SYSTEM

(71) Applicant: Harman International Industries, Incorporated, Stamford, CT (US)

(72) Inventors: Mark Jolly, Campbell, CA (US); Jackie Chang, San Jose, CA (US); Sanjay Rajput, Mountain View, CA (US); Sergey Petrov, Dublin, CA (US); Nikhil Iyer, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 363 days.

(21) Appl. No.: 14/446,198

(22) Filed: Jul. 29, 2014

(65) Prior Publication Data
US 2015/0039633 A1 Feb. 5, 2015

Related U.S. Application Data

(60) Provisional application No. 61/860,111, filed on Jul. 30, 2013.

(51) Int. Cl.
*G06F 17/30* (2006.01)

(52) U.S. Cl.
CPC .... *G06F 17/30371* (2013.01); *G06F 17/3053* (2013.01)

(58) Field of Classification Search
CPC ............ H04N 21/482; H04N 5/44543; H04N 21/4622; H04N 5/50; H04N 21/2665; H04N 21/4263; H04N 21/4312; H04N 21/4383; H04N 21/4821; G06F 17/30029; G06F 17/30058; G06F 17/30867

USPC .............. 348/731; 725/44, 47; 707/748, 758
See application file for complete search history.

(56) References Cited

U.S. PATENT DOCUMENTS

| 5,982,411 | A | * | 11/1999 | Eyer | .................. | H04N 5/44543 |
| | | | | | | 348/569 |
| 2006/0035610 | A1 | * | 2/2006 | Potrebic | ................. | H04H 40/18 |
| | | | | | | 455/178.1 |
| 2006/0150214 | A1 | * | 7/2006 | Ramraz | .............. | H04N 5/44543 |
| | | | | | | 725/44 |
| 2008/0028043 | A1 | * | 1/2008 | Garbow | ............ | G06F 17/30035 |
| | | | | | | 709/219 |
| 2010/0162172 | A1 | * | 6/2010 | Aroner | .............. | G06F 17/30058 |
| | | | | | | 715/838 |
| 2010/0229199 | A1 | * | 9/2010 | Park | .................... | H04N 5/44543 |
| | | | | | | 725/44 |
| 2012/0233640 | A1 | * | 9/2012 | Odryna | .............. | H04N 21/4622 |
| | | | | | | 725/45 |

\* cited by examiner

*Primary Examiner* — Dennis Truong
(74) *Attorney, Agent, or Firm* — McCoy Russell LLP

(57) ABSTRACT

Embodiments are disclosed for identifying duplicate stations in a radio station network. An example method includes identifying stations within a radio station network, determining which of the stations are duplicate stations, and selecting, via automated operated content management devices or user input directed to manually operated content management devices, which of the duplicate stations to show and which of the duplicate stations to suppress from being presented to a user. The example method further includes selectively displaying a selected duplicate station of a group of duplicate stations depending on a radio network's contractual agreements with various partners.

20 Claims, 23 Drawing Sheets

Set Content Type/Bit Rate Priorities
Home

| Content Type Grouping | Bit Rate Range | Rank* | Delete Row |
|---|---|---|---|

( Add )

*Note: All values for Rank must be different.

( Update )

FIG. 8A

Set Content Type/Bit Rate Priorities
Home

| Content Type Grouping | Bit Rate Range | Rank* | Delete Row |
|---|---|---|---|
| ( Select ⬍ ) | ( Select ⬍ ) | ☐ | ☐ |

( Add )

*Note: All values for Rank must be different.

( Update )

DUPLICATE STATION DETECTION SYSTEM

CROSS-REFERENCE TO RELATED APPLICATIONS

The present application claims priority to U.S. Provisional Application No. 61/860,111 filed on Jul. 30, 2013, which is hereby incorporated by reference in its entirety for all purposes.

FIELD

Embodiments of the subject matter disclosed herein relate to internet radio, and more particularly, to detecting duplicate internet radio stations.

BACKGROUND AND SUMMARY

Many internet radio stations exist on the web. There are various sources that provide listings of such internet radio stations, such as a radio network. Such radio networks aggregate various internet radio stations from a combination of sources. It is possible, however, that multiple third-party data providers may list the same station. As a result, there is the possibility of ending up with many duplicate stations when aggregating stations.

The presence of many duplicate stations degrades user experience. One approach to removing duplicate stations may include comparing each aggregated station in the network to every other station in the network to find a duplicate. However, the number of stations in a network greatly increases the complexity of determining that a station is a duplicate. For example, typical aggregated radio networks, such as Aha Radio Network, feature over 400,000 radio stations. Iterating through all of the stations and comparing each station to each other station to determine the duplicates quickly becomes computationally expensive, as such an approach has an exponential time complexity. That is, for n stations, each station is checked against the other (n−1) stations, so that the time complexity is on the order of $n(n-1)=O(n^2)$.

This disclosure recognizes the above issue and provides several approaches to address them. In particular, systems and methods for detecting duplicate radio stations are provided. In some embodiments, an example method for managing duplicate stations in a radio network includes identifying stations within a radio station network and determining which of the stations are duplicate stations. The example method may further include selecting, via automated operated content management devices or user input directed to manually operated content management devices, which of the duplicate stations to show and which of the duplicate stations to suppress from being presented to a user and selectively displaying a selected duplicate station of a group of duplicate stations depending on contractual agreements between the radio station network and one or more partners.

In other embodiments, an example method for managing duplicate radio stations in a radio network includes comparing a station within the radio station network to previously compared stations, responsive to the station not matching any station of the previously compared stations, assigning to the station a new identification number, and responsive to the station matching at least one station of the previously compared stations, assigning to the station an identification number previously assigned to the at least one station of the previously compared stations. The example method may further include determining a ranking of each duplicate station in a group of duplicate stations, during a first mode, displaying a first duplicate station of the group of duplicate stations responsive to the first duplicate station having a higher ranking than other stations in the group of duplicate stations, and during a second mode, displaying a second duplicate station of the group of duplicate stations responsive to the second duplicate station having a higher ranking than the first duplicate station and the other stations in the group of duplicate stations.

In some embodiments, an example system for managing duplicate radio stations in a radio network may include a processor and a non-transitory computer readable medium storing instructions executable by the processor to identify duplicate stations within a radio station network and determine which of the stations are duplicate stations. The instructions may be further executable to select, via automated operated content management devices or user input directed to manually operated content management devices, which of the duplicate stations to show and which of the duplicate stations to suppress from being presented to a user, and selectively present a selected duplicate station of a group of duplicate stations depending on contractual agreements between the radio station network and one or more partners.

It is to be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Figures 8C, 8D:
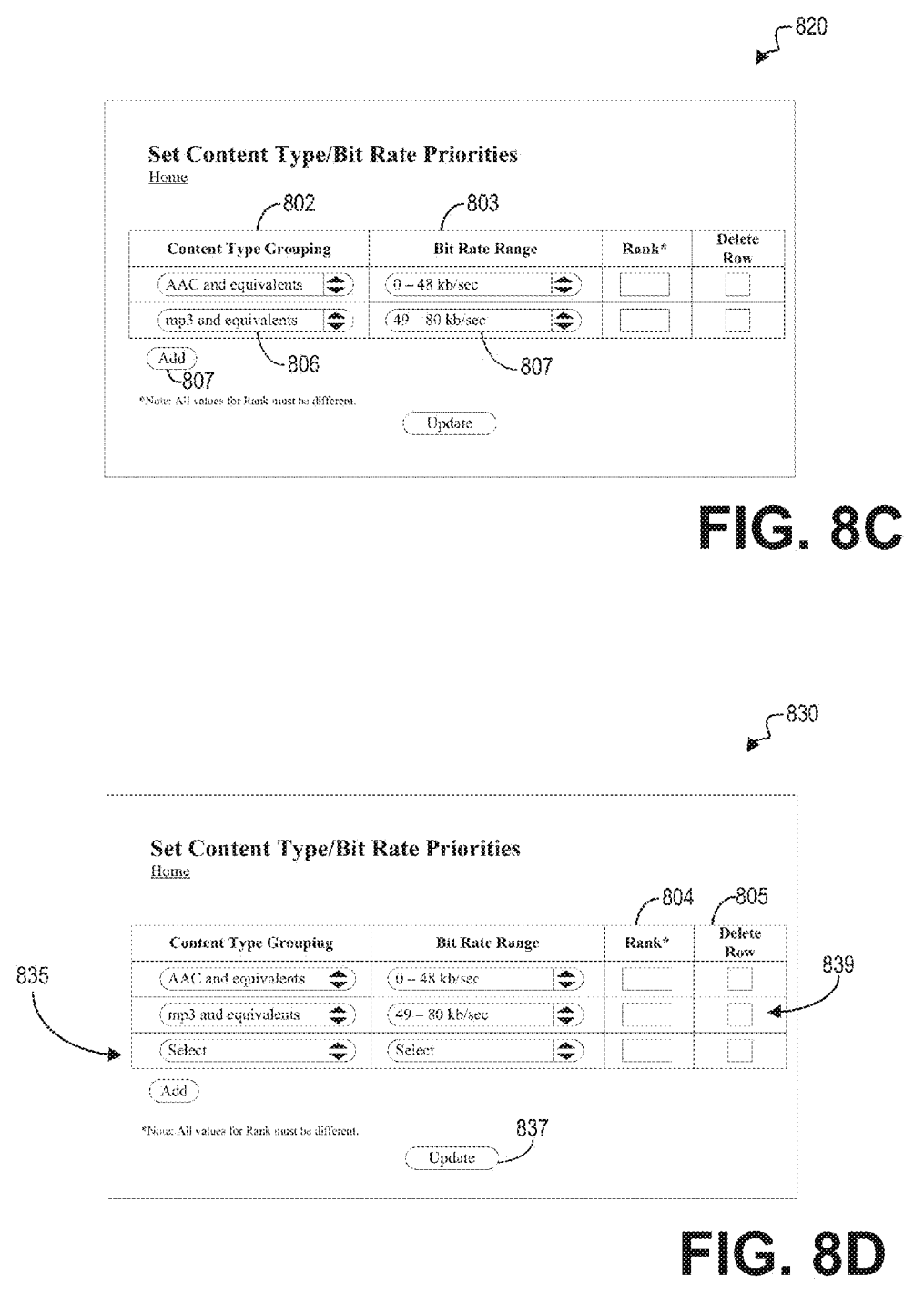

FIGS. 8A-8G show an example interface for setting content type and bit rate priorities.

Figure 12:
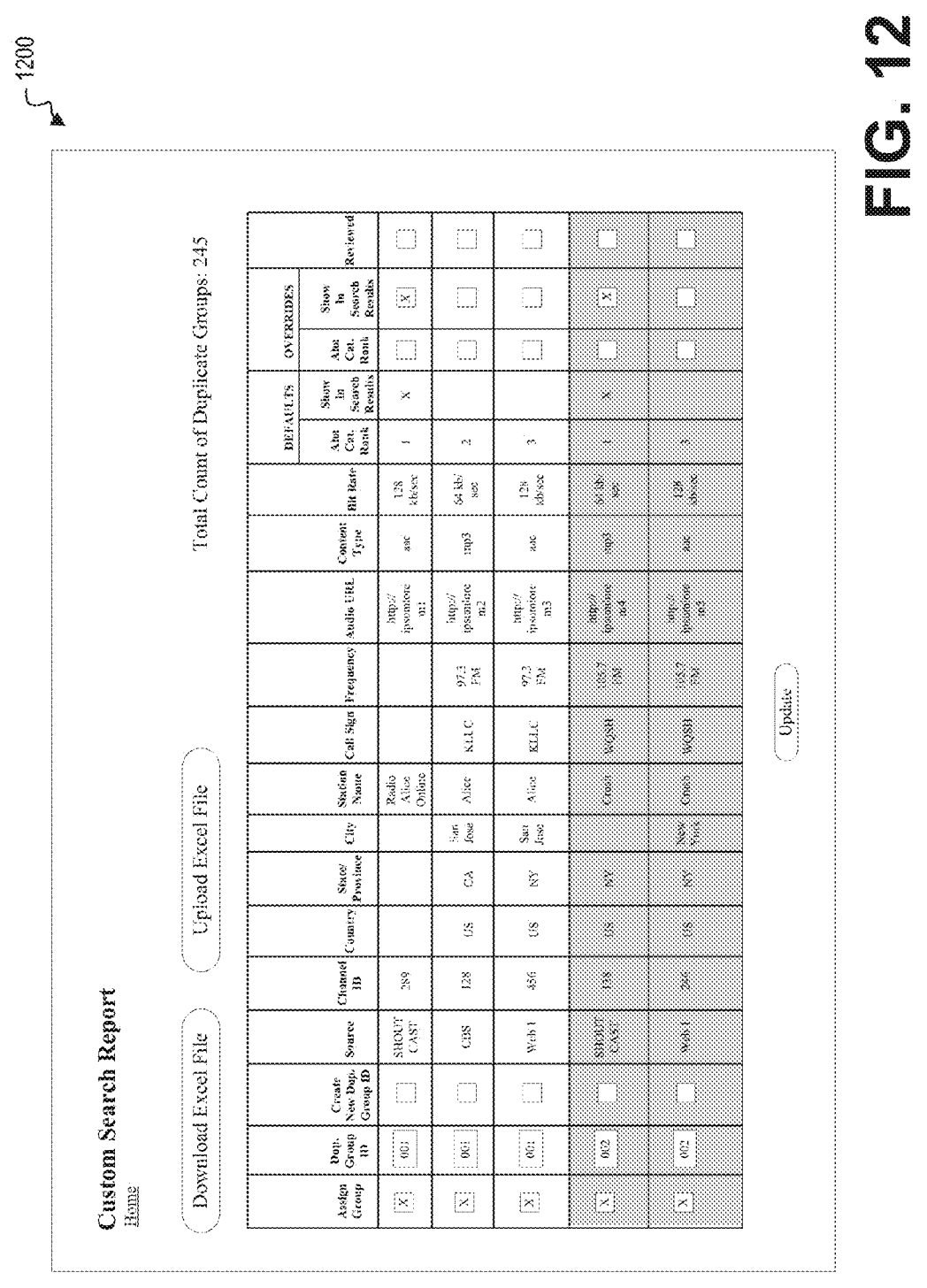

FIG. 12 shows an example custom search report.

DETAILED DESCRIPTION

Figure 3:
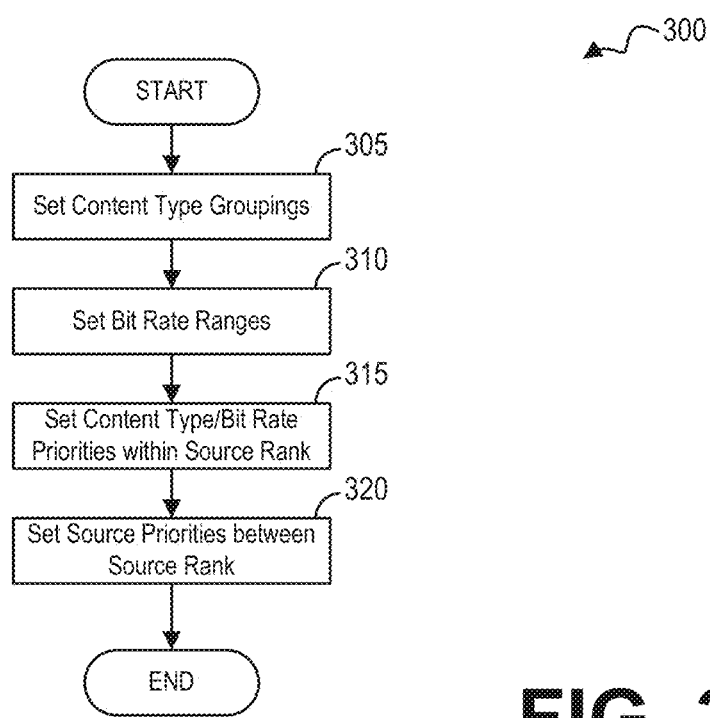
FIG. 3 shows a high-level flow chart illustrating an example method for setting up a duplicate station detection system.
Figure 4:
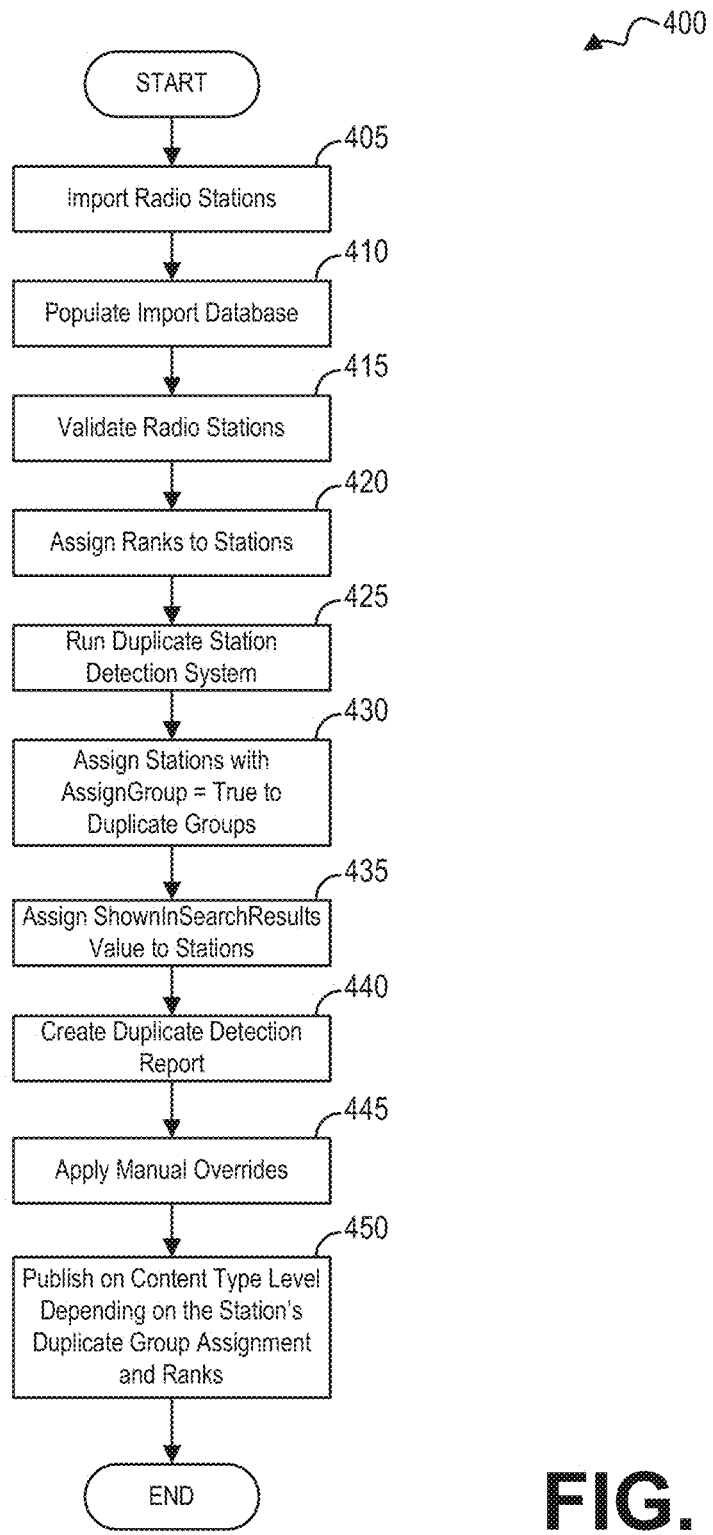
FIG. 4 shows a high-level flow chart illustrating an example method for automatically aggregating and publishing radio stations.
Figure 8E:
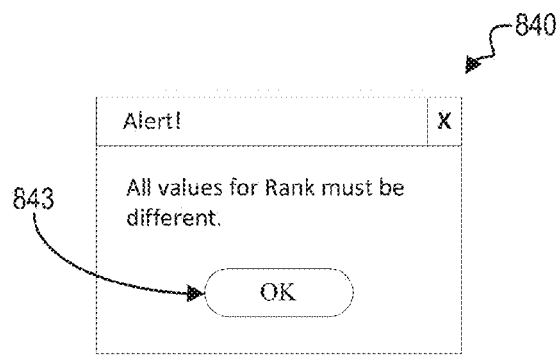
Figure 9:
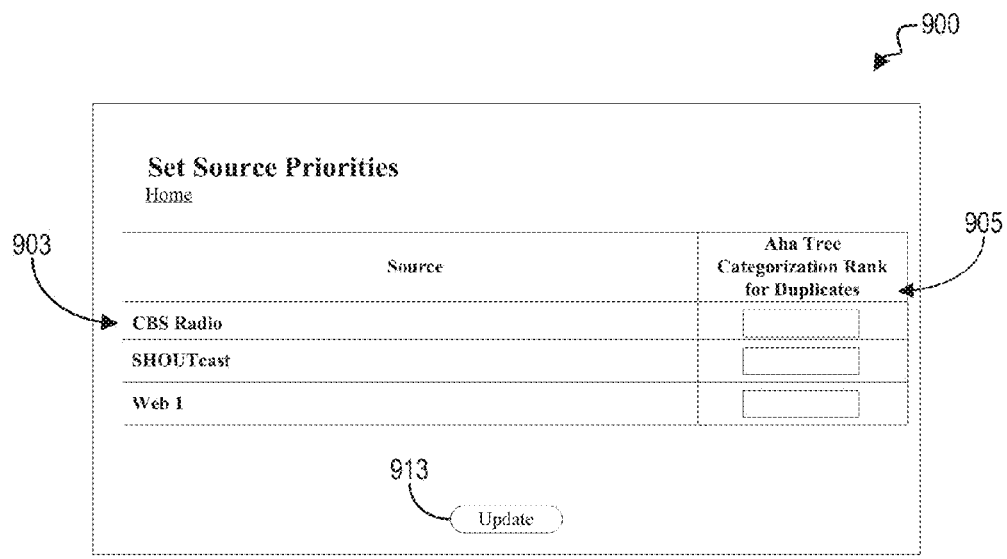
FIG. 9 shows an example interface for setting source priorities.
Figure 10:
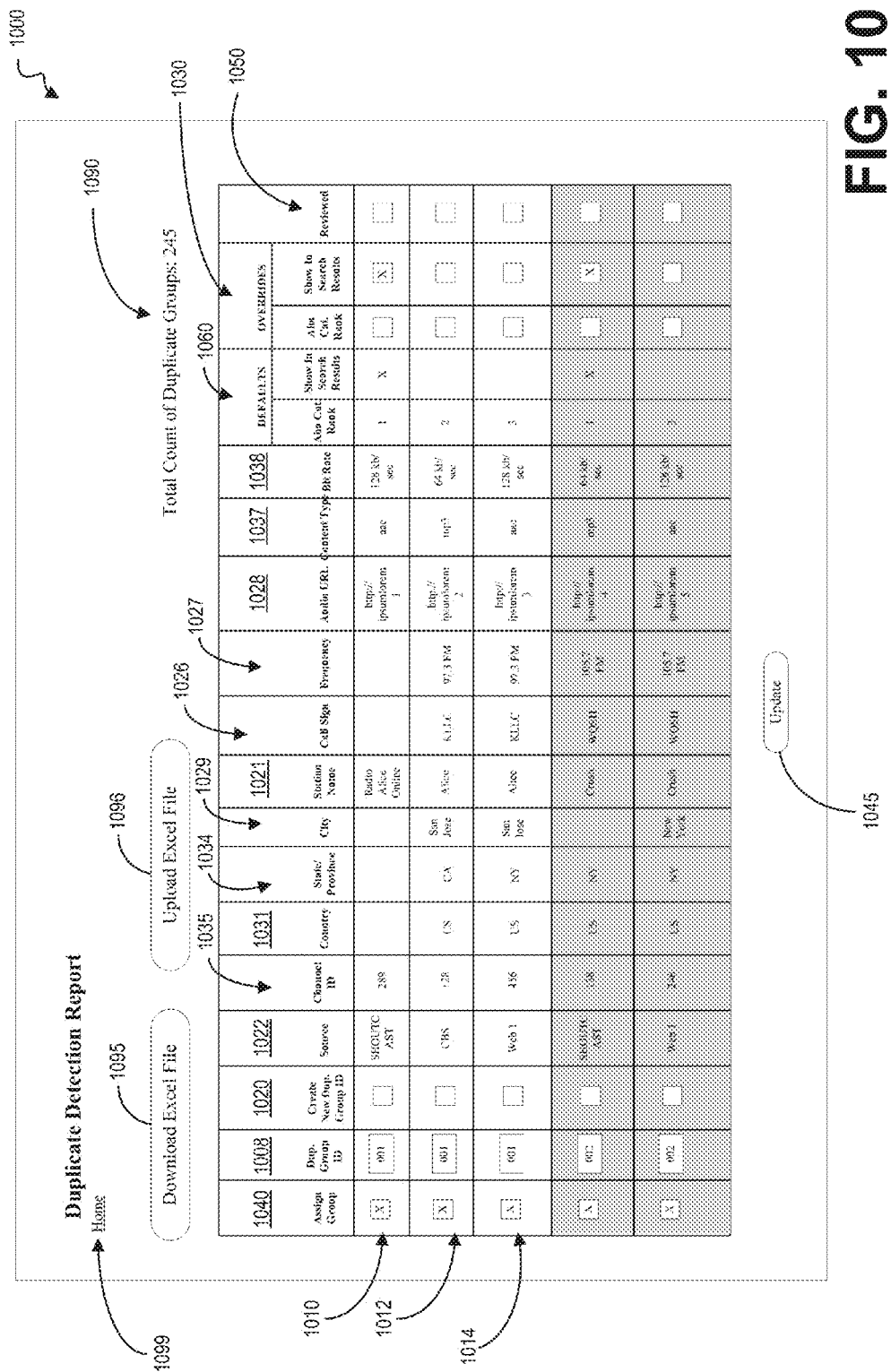
FIG. 10 shows an example duplicate detection report.
Figure 11:
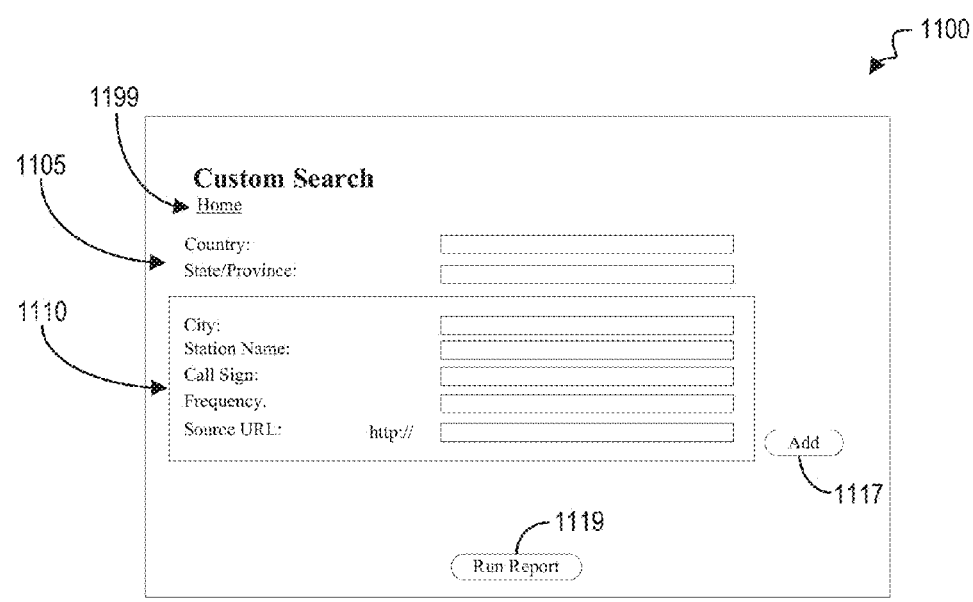
FIG. 11 shows an example custom search interface.
Figure 13:
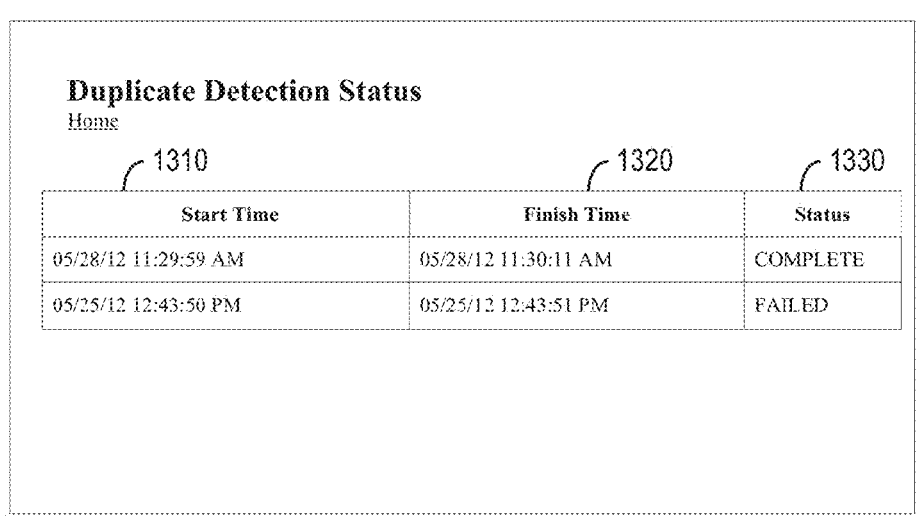
FIG. 13 shows an example duplicate detection status report.
Figure 14:
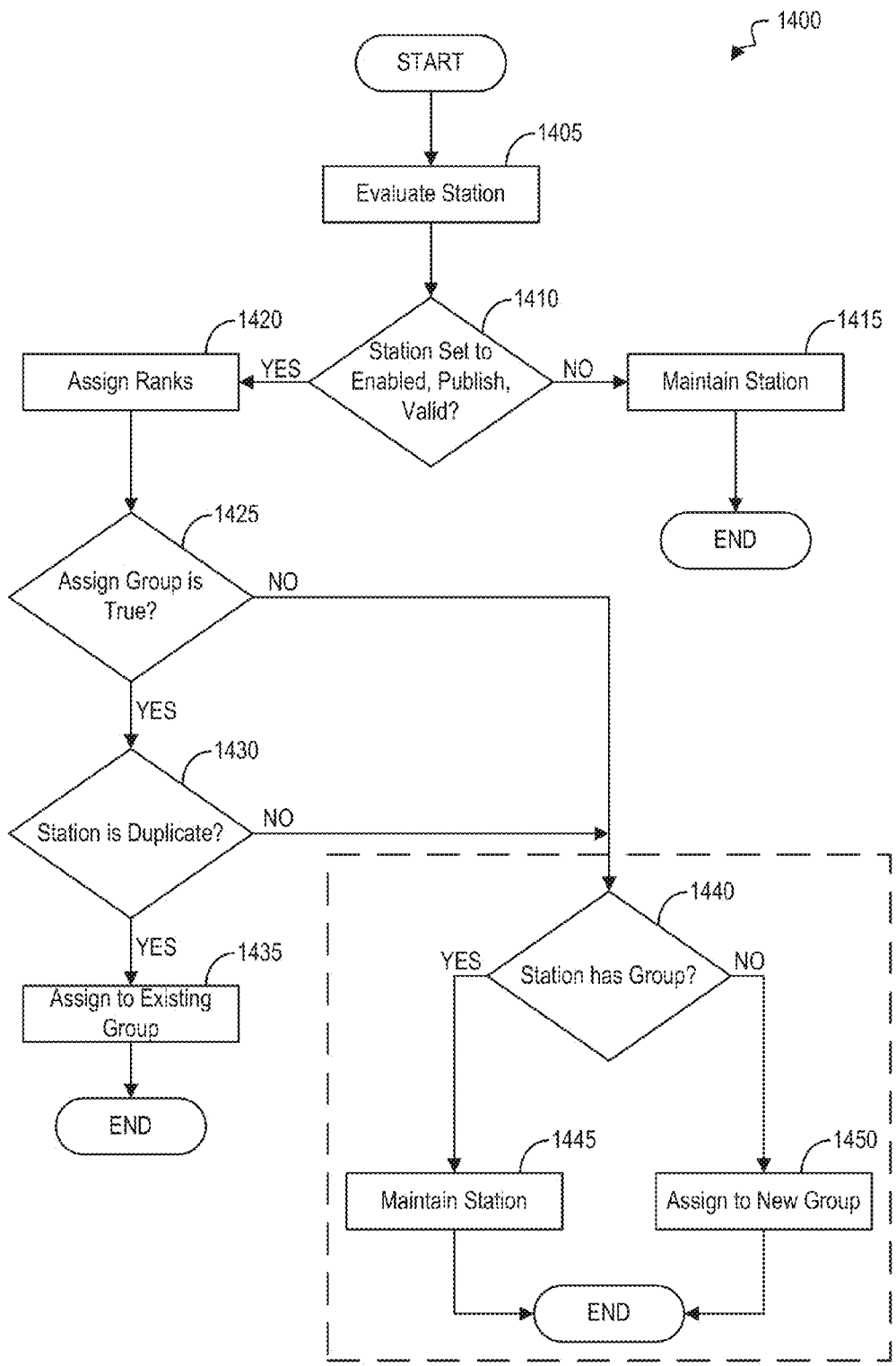
FIG. 14 shows a high-level flow chart illustrating an example method for assigning a station to a duplicate group.
Figure 15:
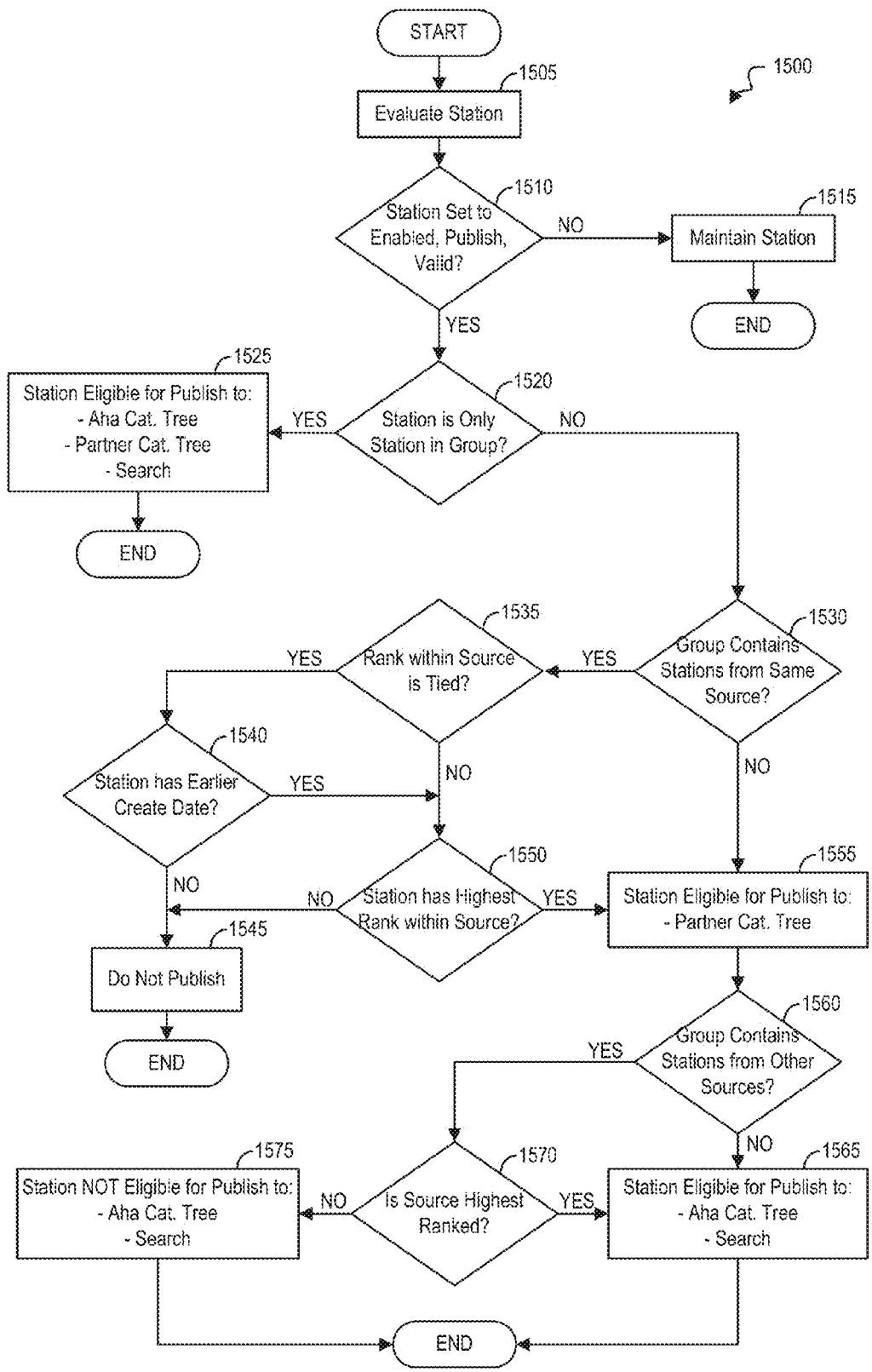
FIG. 15 shows a high-level flow chart illustrating an example method for determining where to publish a station.

The present description is related to aggregating internet radio stations. Specifically, methods and systems for automatically detecting duplicate radio stations are described. Automatically detecting duplicate radio stations may be carried out by an electronic computing device, such as the computing device shown in FIG. 1 and described in more detail below. The computing device may detect duplicate radio stations using a computationally efficient method, such as the method depicted in FIG. 2 and described in more detail below. When dealing with a large number of aggregated radio stations, priorities may be established before aggregation and processing in order to minimize manually handling duplicate stations. For example, settings regarding radio stream quality and content partnerships may be established using the method shown in FIG. 3. FIG. 4 depicts a full method for aggregating radio stations from various sources, ranging from importing, processing, detecting duplicates, and publishing to a radio network. The electronic computing device may include a content management interface for importing, processing, and publishing aggregated radio stations, such as the one shown in FIG. 5. FIGS. 6A-6G illustrate interfaces for managing content types. FIGS. 7A-7G illustrate interfaces for managing bit rate ranges. FIGS. 8A-8G illustrate interfaces for setting content type and bit rate priorities. FIG. 9 illustrates an interface for setting source priorities. FIG. 10 illustrates an overview of the duplicate radio stations detected that may be provided to a content manager. FIG. 11 depicts a custom search interface, while FIG. 12 illustrates an interface for custom search results. FIG. 13 depicts an interface for checking the status of a duplicate station detection process. FIG. 14 depicts a method for assigning a station to a duplicate group. FIG. 15 depicts a method for determining where to publish a station.

Figure 1:
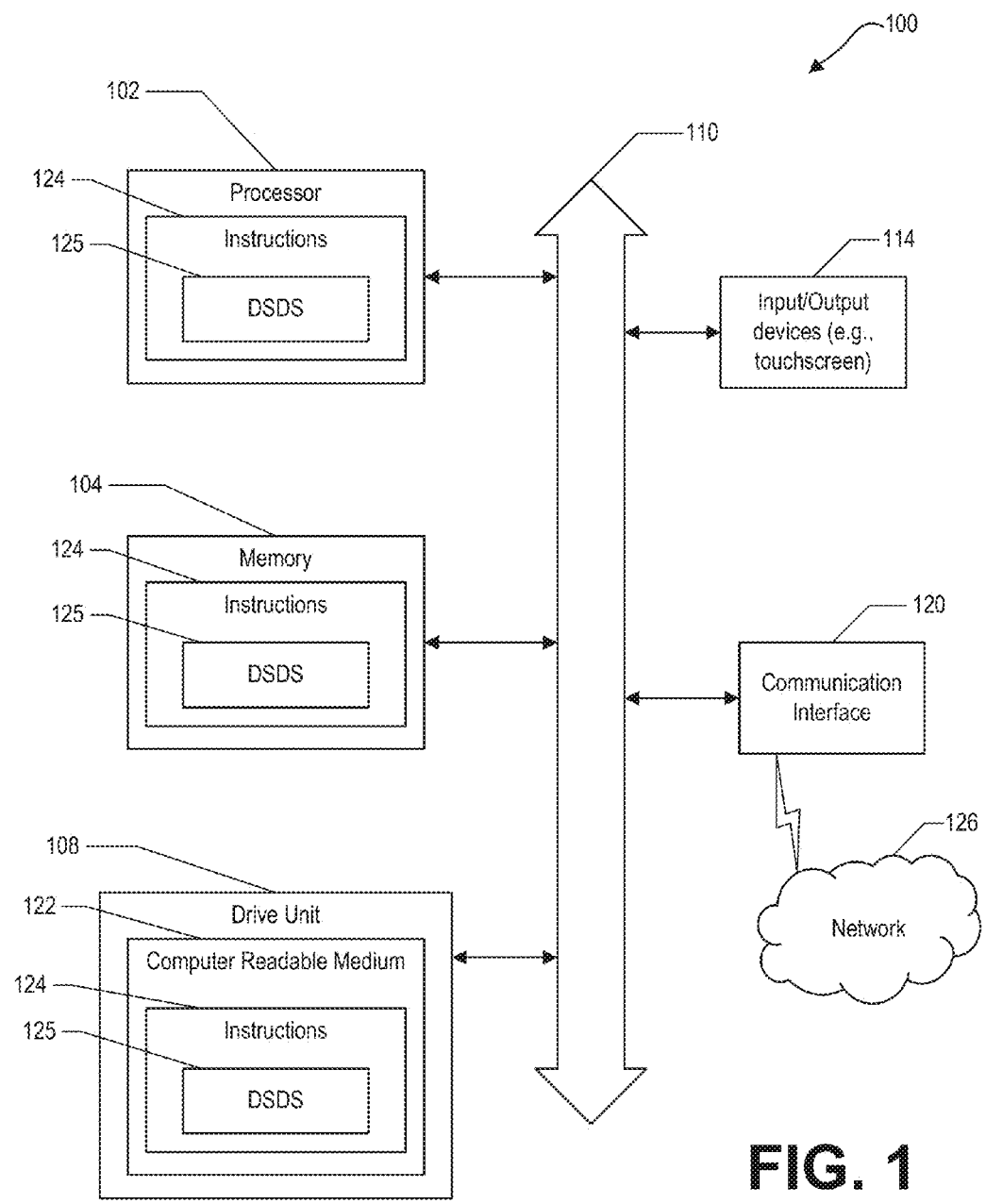
FIG. 1 shows an example electronic device in accordance with the current disclosure.

FIG. 1 is a block diagram of an example electronic device 100 that may include one or more aspects or modules of an example duplicate station detection system (DSDS). The electronic device 100 may include a set of instructions that may be executed to cause one or more modules of the electronic device 100 to perform any of the methods and/or computer-based functions disclosed herein. The electronic device 100 may operate as a standalone device, may be included as functionality within a device also performing other functionality, and/or may be in communication with, for example, other computer systems, devices, or peripheral devices via a network.

In the example of a networked deployment, the electronic device 100 may operate in the capacity of a server or a client user computer in a server-client user network environment, as a peer computer system in a peer-to-peer (or distributed) network environment, and/or in various other ways. The electronic device 100 may also be implemented as, or incorporated into, various electronic devices, for example: hand-held devices such as smart phones and tablet computers; portable media devices such as recording, playing, and gaming devices; household electronics such as smart appliances and smart televisions; set-top boxes; automotive electronics such as head units and navigations systems (e.g., in-vehicle computing devices); or any other machine capable of executing a set of instructions (sequential or otherwise) that result in actions to be taken by that machine. The electronic device 100 may be implemented using electronic devices that provide voice, audio, video, and/or data communication. While a single device 100, such as an electronic device, is illustrated, the term "device" may include any collection of devices or sub-devices that individually or jointly execute a set, or multiple sets, of instructions to perform one or more functions.

The electronic device 100 may include a processor 102, such as a central processing unit (CPU), a graphics processing unit (GPU), or both. The processor 102 may be a component in a variety of systems. For example, the processor 102 may be part of a head unit in a vehicle. Also, the processor 102 may include one or more general processors, digital signal processors, application-specific integrated circuits, field programmable gate arrays, servers, networks, digital circuits, analog circuits, combinations thereof, or other now known or later developed devices for analyzing and processing data. The processor 102 may implement a software program, such as code generated manually or programmed.

The electronic device 100 may include memory, such as a memory 104 that may communicate via a bus 110. The memory 104 may be or include a main memory, a static memory, or a dynamic memory. The memory 104 may include any non-transitory memory device. The memory 104 may also include computer readable storage media such as various types of volatile and non-volatile storage media including random access memory, read-only memory, programmable read-only memory, electrically programmable read-only memory, electrically erasable read-only memory, flash memory, a magnetic tape or disk, optical media, and the like. Also, the memory may include a non-transitory tangible medium upon which software may be stored. The software may be electronically stored as an image or in another format (such as through an optical scan), and include instructions that may be compiled, interpreted, or otherwise processed.

In one example DSDS, the memory 104 may include a cache or random access memory for the processor 102. In alternative examples, the memory 104 may be separate from the processor 102, such as a cache memory of a processor, the system memory, or other memory. The memory 104 may be or include an external storage device or database for storing data. Examples include a hard drive, compact disc (CD), digital video disc (DVD), memory card, memory stick, floppy disc, universal serial bus (USB) memory device, memory device, or any other device operative to store data. For example, the electronic device 100 may also include a disk or optical drive unit 108. The drive unit 108 may include a computer-readable medium 122 in which one or more sets of software or instructions, such as the instructions 124, may be embedded. The processor 102 and the memory 104 may also include a computer-readable storage medium with instructions or software.

The memory 104 may be operable to store instructions executable by the processor 102. The functions, acts, or tasks illustrated in the figures or described may be performed by the programmed processor 102 executing the instructions stored in the memory 104. The functions, acts, or tasks may be independent of the particular type of instructions set, storage media, processor, or processing strategy, and may be performed by software, hardware, integrated circuits, firmware, microcode, and the like, operating alone or in combination. Likewise, processing strategies may include multiprocessing, multitasking, parallel processing, and the like.

The instructions 124 may include the methods and/or logic described herein, including aspects or modules of the electronic device 100 and/or an example proximity location system (such as DSDS module 125). The instructions 124 may reside completely, or partially, in the memory 104 or in the processor 102 during execution by the electronic device 100. For example, software aspects or modules of the DSDS (such as the DSDS module 125) may include examples of various duplicate station detection processors that may reside completely, or partially, in the memory 104 or in the processor 102 during execution by the electronic device 100.

With respect to various duplicate station detection processors (or signal processors) that may be used by the DSDS, hardware or software implementations of such processors may include analog and/or digital signal processing modules (and analog-to-digital and/or digital-to-analog converters). The analog signal processing modules may include linear electronic circuits such as passive filters, active filters, additive mixers, integrators, and delay lines. Analog processing modules may also include non-linear circuits such as compandors, multiplicators (frequency mixers and voltage-controlled amplifiers), voltage-controlled filters, voltage-controlled oscillators, and phase-locked loops. The digital or discrete signal processing modules may include sample and hold circuits, analog time-division multiplexers, analog delay lines, and analog feedback shift registers, for example. In some implementations, the digital signal processing modules may include ASICs, field-programmable gate arrays or specialized digital signal processors (DSP chips). Such digital signal processing modules may enhance an image signal via arithmetical operations that include fixed-point and floating-point, real-valued and complex-valued, multiplication, and/or addition. Other operations may be supported by circular buffers and/or look-up tables. Such operations may include Fast Fourier transform (FFT), finite impulse response (FIR) filter, infinite impulse response (IIR) filter, and/or adaptive filters.

The modules described herein may include software, hardware, firmware, or some combination thereof executable by a processor, such as processor 102. Software modules may include instructions stored in memory, such as memory 104, or another memory device, that may be executable by the processor 102 or other processor. Hardware modules may include various devices, components, circuits, gates, circuit boards, and the like that are executable, directed, or controlled for performance by the processor 102. The term "module" may include a plurality of executable modules.

Further, the electronic device 100 may include a computer-readable medium that may include the instructions 124 or receives and executes the instructions 124 responsive to a propagated signal so that a device in communication with a network 126 may communicate voice, video, audio, images, or any other data over the network 126. The instructions 124 may be transmitted or received over the network 126 via a communication port or interface 120, or using a bus 110. The communication port or interface 120 may be a part of the processor 102 or may be a separate component. The communication port or interface 120 may be created in software or may be a physical connection in hardware. The communication port or interface 120 may be configured to connect with the network 126, external media, one or more input/output devices 114, one or more sensors 116, or any other components in the electronic device 100, or combinations thereof. The connection with the network 126 may be a physical connection, such as a wired Ethernet connection or may be wirelessly established. The additional connections with other components of the electronic device 100 may be physical connections or may be wirelessly established. The network 126 may alternatively be directly in communication with the bus 110.

The network 126 may include wired networks, wireless networks, Ethernet AVB networks, a CAN bus, a MOST bus, or combinations thereof. The wireless network may be or include a cellular telephone network, an 802.11, 802.16, 802.20, 802.1Q, or WiMax network. The wireless network may also include a wireless LAN, implemented via WI-FI or BLUETOOTH technologies. Further, the network 126 may be or include a public network such as the Internet, a private network such as an intranet, or combinations thereof, and may utilize a variety of networking protocols now available or later developed using TCP/IP-based networking protocols. One or more components of the electronic device 100 may communicate with each other by or through the network 126.

The one or more input/output devices 114 may be configured to allow a user to interact with any of the components of the electronic device. Such devices may be in communication with the user interfaces described herein. The one or more input/output devices 114 may include a keypad, a keyboard, and a cursor control device such as a mouse or a joystick. Also, the one or more input/output devices 114 may include a microphone, one or more visual displays, speakers, remote controls, touchscreen displays, or any other devices operative to interact with the electronic device 100, such as any device operative to act as an interface between the electronic device and one or more users and/or other electronic devices.

The DSDS module 125 may take into account several parameters in comparing stations to determine if the stations are duplicates, such as a URL of an Internet radio stream, call signs of stations, station name, station location, and/or any other suitable parameter(s). These parameters may be used to group stations as duplicates. An example method for determining duplicate stations is described further herein and with regard to FIG. 2.

In some examples, a user of electronic device 100 may be referred to as a content manager, as the user may utilize electronic device 100 to manage radio station network content as described further herein. In some examples, the DSDS may define what constitutes a duplicate station and how to identify such a duplicate station. The DSDS may take into account several factors in comparing stations to determine if the stations are duplicates, such as the URL of the Internet radio stream, call signs of the stations, station name, station location, and/or any other suitable parameter(s).

In a case where the system finds duplicates, a process may allow electronic device 100 to choose the best quality duplicate station to present to users. Content management devices may use a part of the tool to specify the best combination of bit rate and content file type, and the process may consider this in deciding which of the duplicate stations to present to the user.

In some examples, when choosing between duplicate stations, in addition to station quality, another consideration is to take contractual obligations with certain partners into account. For example, some agreements may use the entire station catalogue of a partner to be displayed in the radio application or in certain parts of the application. Thus, the DSDS tool may provide a way for content management devices to manage these relationships, which are then taken into account by the DSDS system.

In the Aha example, Internet radio stations from various third-party providers, such as CBS and SHOUTCAST, are aggregated. It is possible that multiple third-party data providers may list the same station. When an application aggregates the URLs, duplicate stations may be present. Identifying and prioritizing duplicate stations, such as duplicate internet radio stations, may provide a better user experience than presenting the duplicate stations, as the user may avoid the potential confusion and frustration associated with viewing redundant listings.

As an example, the DSDS may perform the following actions to identify duplicate stations. If the audio URLs of two distinct stations is an exact match, then the DSDS may consider the two stations as duplicates. If the call sign of two distinct stations match then the DSDS may group the stations as similar. The DSDS may use various permutations of attributes of a station to determine that a duplicate exists.

The process of the DSDS that groups stations as duplicates may be transitive. For example, if station 1 and station 2 have the same audio URL, and station 2 and station 3 have the same call sign, then all three stations may be grouped as duplicates of each other.

In some examples, the DSDS may use a hashing-based technique to reduce the number of iterations from n to 1. In such examples, the DSDS may use a map, such as map <property, dup_groupID>, where property may include audio URL, call sign, or attributes, while dup_groupID represents a group of duplicate stations. The DSDS may create a separate map for each property. For example, the system may create an audio URL map (audioUrlMap), a call sign map (callSignMap), and an attributes map (attributesMap). Then, the DSDS may iterate through all the stations. For each station, the DSDS may check if audioUrlMap includes the audio URL associated with the station. If an entry is found in the map, then the station is a duplicate of an existing group of stations (dup_groupID). Then, the DSDS may mark the stations as being part of dup_groupID. Additionally or alternatively, the DSDS may check if callSignMap includes the call sign associated with the station. If an entry is found in the map, then the station may be considered to be (e.g., designated as) a duplicate of an existing group of stations (dup_groupID). The DSDS may check if attributesMap includes the attributes associated with the station. If an entry is found in the map, then the station may be considered to be (e.g., designated as) a duplicate of an existing group of stations (dup_groupID). Then, for example, the DSDS may mark the stations as being part of dup_groupID. Alternatively, no duplicate may exist. Finally, the DSDS may create a new dup_groupID and update the maps with information from the station. A hash-based process is described further below with regard to FIG. 2.

Figure 2:
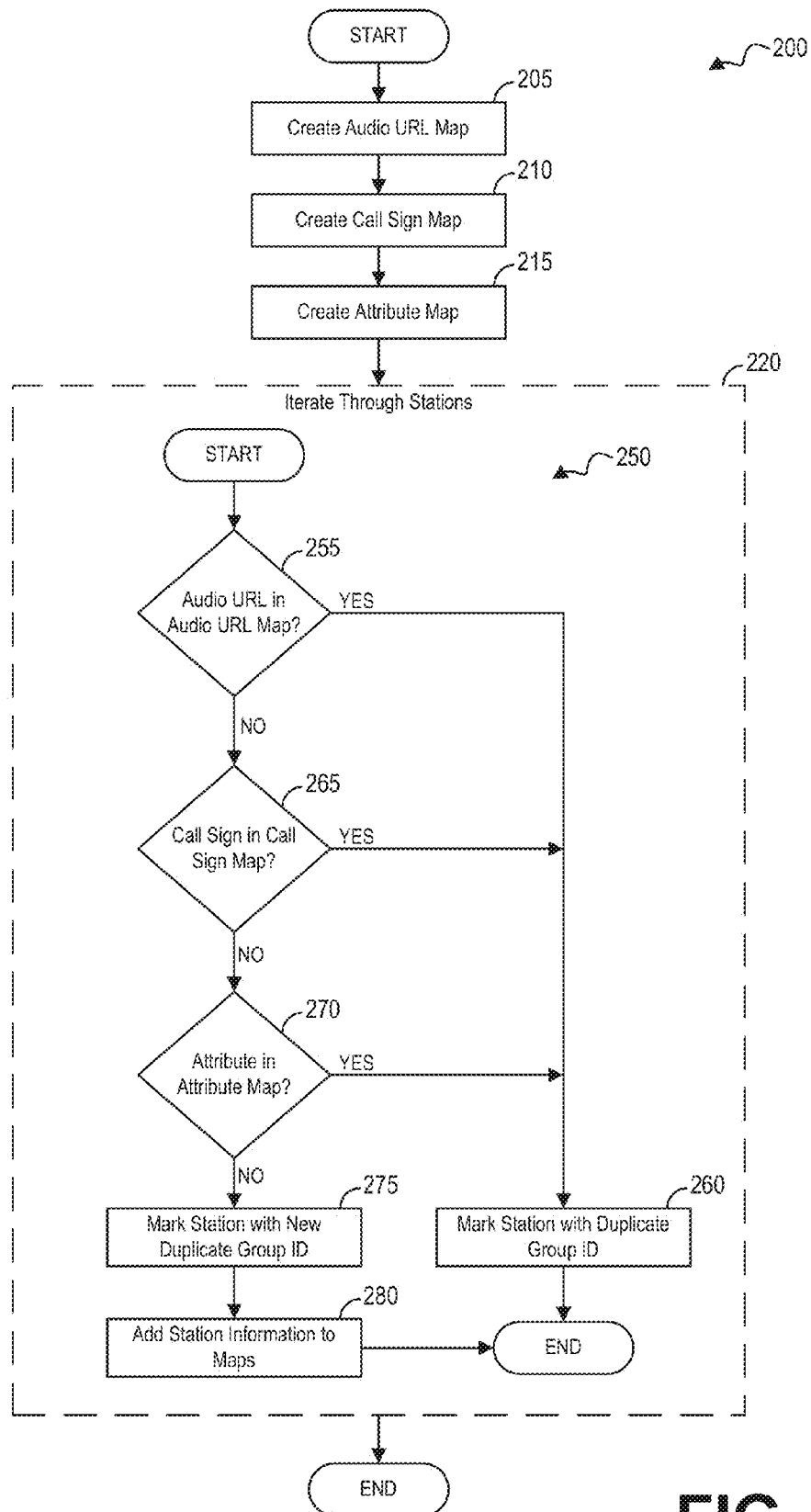
FIG. 2 shows a high-level flow chart illustrating an example method for detecting duplicate radio stations.

FIG. 2 shows a high-level flow chart illustrating an example method 200 for detecting duplicate internet radio stations in accordance with the current disclosure. A typical radio station may include the following properties: audio URL, which is the internet address at which the station is streaming audio; call sign, which is a tag line identifying a station, possibly uniquely, such as KROQ, Radio Mirchi, etc.; attributes, which may comprise station name, address (city, state, country), and/or other suitable descriptive features of the station. Method 200 may utilize such properties for duplicate station detection and may therefore be executed in the duplicate station detection system 125 of FIG. 1. To that end, method 200 may be stored as executable instructions in non-transitory memory 104 on electronic device 100.

Method 200 may begin at 205 and include creating an audio URL map. At 210, method 200 may include creating a call sign map. At 215, method 200 may include creating an attribute map. An attribute map may be used to further distinguish a radio station from each other radio station. For example, an attribute map may comprise a location map and include country, state, and city information. An attribute map may also be used to identify the original stream from a group of duplicates. For example, an attribute map may comprise a bit rate map. In some examples, there may be a location map and a bit rate map. In another example, an attribute map may comprise a station name map. Creating the maps at 205, 210, and 215 may include creating data structures and/or other data entries for information such as URLs, call signs, and attributes for storage in memory. In some examples, the maps may be empty (e.g., having allocated space and/or no specific listings of URLs, call signs, and/or attributes) until at least a first pass through a duplicate detection iteration, indicated at 220.

After establishing different maps for duplicate detection, method 200 may continue to 220. At 220, method 200 may include iterating through each station using the map information. For example, 220 may include a sub-process 250 that is applied to each station. Sub-process 250 compares the information associated with each station to information stored in the maps, and in this way may detect duplicate stations. Sub-process 250 may be applied to one station at a time, where the station includes an audio URL, a call sign, one or more attributes, etc. In other examples, sub-process 250 may be performed for two or more stations simultaneously. For example, stations may be processed in batches to reduce a total number of iterations. In such examples, each station in a given batch may be compared to other stations in the batch at one or more points in the method in order to ensure that stations in the batch are not duplicates of one another. For example, if two or more stations in a batch have the same audio URL but no prior-processed station has had that audio URL, the duplicate stations within the batch may both be marked with a new duplicate group ID unless the stations are checked against one another first.

Sub-process 250 may begin at 255. At 255, sub-process 250 may include determining if the audio URL of the station is stored in the audio URL map. If the audio URL is found in the audio URL map, then sub-process 250 has previously identified a station with the same audio URL. Therefore the station may be a duplicate, and sub-process 250 continues to 260. At 260, sub-process 250 may include marking the station with a duplicate group ID associated with the previously processed station whose audio URL matches the station currently being processed. In this way, the at least two stations may be grouped under one duplicate group ID and later identified as duplicates. After marking the duplicate station with the duplicate group ID indicating that the station is a duplicate of an existing group of stations, sub-process 250 may then end.

Returning to 255, if the audio URL of the station is not found in the audio URL map, then sub-process 250 may continue to 265. At 265, sub-process 250 may include determining if the call sign of the station is stored in the call sign map. If the call sign is found in the call sign map, then sub-process 250 has previously identified a station with the same call sign. Therefore the station may be a duplicate, and sub-process 250 continue to 260. At 260, sub-process 250 may include marking the station with a duplicate group ID associated with the previously processed station whose call sign matches the station currently being processed. In this way, the at least two stations may be grouped under one duplicate group ID and later identified as duplicates. After marking the duplicate station with the duplicate group ID, sub-process 250 may end.

Returning to 265, if the call sign of the station is not found in the call sign map, sub-process 250 may continue to 270. At 270, sub-process 250 may include determining if an attribute of the station is stored in the attribute map. For example, an attribute may be the station location and include city, state, and country. If the attribute is found in the attribute map, then sub-process 250 has previously identified a station with the same attribute. Therefore the station may be a duplicate, and sub-process 250 continues to 260. At 260, sub-process 250 may include marking the station with a duplicate group ID associated with the previously processed station whose attribute matches the station currently being processed. In this way, the at least two stations may be grouped under one duplicate group ID and later identified as duplicates. Note that being marked with the same attribute may not immediately indicate a duplicate station, as multiple distinct radio stations may be located in the same city. However, such attribute information may be useful for distinguishing two radio stations with an identical call sign but located in different parts of the world. After marking the duplicate station with the duplicate group ID indicating that the station is a duplicate of an existing group of stations, sub-process 250 may then end.

Returning to 270, if the attribute of the station is not found in the attribute map, then sub-process 250 may continue to 275. At 275, sub-process 250 may include marking the station with a new duplicate group ID. At 280, sub-process 250 may include adding the station information such as audio URL, call sign, and attributes to the maps. In this way, a duplicate of the presently processed station may be detected during later iterations of sub-process 250. Sub-process 250 may then end.

After iterating through each station with sub-process 250, method 200 may then end. At the conclusion of method 200, any duplicate group ID that is associated with more than one station indicates a duplicate station or a potentially duplicate station.

As the duplicate station detection system comprises a hash-based approach, the computation time to compare a station to each other station is reduced from a number of stations n to a constant, as there are three comparisons instead of n comparisons. Hence, the computational complexity of determining the duplicate stations of a number of stations n is reduced from $O(n^2)$ to $O(n)$. That is, the time complexity is reduced to linear time complexity from exponential time complexity.

Tools for managing duplicate content may be integrated with existing content management tools associated with a network of stations, such as a network of internet radio stations. For example, the tools described herein may apply to any type of network of stations or an application associated with a network of stations. A duplicate content management tool of the DSDS may automatically detect internet radio stations that are duplicates, as described herein above. The tool may also allow the duplicate detection results to be overridden by a content manager. When duplicates are found, which duplicate may be published and where may be determined by combinations of the source, content type, bit rate of the content, and/or other suitable parameters.

The duplicate content management tool and associated tools may be utilized with an existing content import process. FIG. 3 illustrates a set-up of a duplicate detection tool. FIG. 4 illustrates an automated process for the importing to publishing of stations.

FIG. 3 shows a high-level flow chart illustrating an example method 300 for setting up a duplicate station detection system in accordance with the current disclosure. In particular, method 300 relates to establishing priorities for the DSDS to automatically choose one of a group of duplicate radio stations. Such priorities may be based on the quality of the radio stream and/or a contractual agreement with a partner. Method 300 may be stored as executable instructions in non-transitory memory on electronic device 100 of FIG. 1 in some embodiments.

Method 300 may begin at 305. At 305, method 300 may include setting content type groupings. Setting content type groupings allows the content manager interface or device to group like content types together. This is useful because there are many like content types (for example, mp3, mpeg, x-mpeg, mpg), and grouping content types together decreases the amount of work the content manager interface or device must do to set up the content type/bit rate priorities compared to examples in which each content type is separately set up. Setting up content type/bit rate priorities is described further herein. Setting content type groupings is described further below with regard to FIGS. 6A-6G. After setting content type groupings, method 300 may continue to 310.

At 310, method 300 may include setting bit rate ranges. Setting bit rate ranges allows the DSDS to easily categorize different station streams based on bit rate ranges. Setting bit rate ranges is described further below with regard to FIGS. 7A-7G. After setting bit rate ranges, method 300 may continue to 315.

At 315, method 300 may include setting content type and bit rate priorities within a source rank. Setting content type and bit rate priorities comprises ranking a list of associated content types and bit rate ranges. For example, a radio stream with an Advanced Audio Coding (AAC) content type may have a higher audio quality than a radio stream with an MP3 content type, even though both streams have the same bit rate. Therefore, a content manager may prioritize a radio stream with an AAC content type over a radio stream with an MP3 content type within the same bit rate range. Setting these priorities within a source rank relates to how the audio quality may be deprioritized in view of a source rank. For example, a radio network may have a contractual agreement with one particular source, or partner, which requires every station provided by the source is published on the radio network. In such examples, if the DSDS detects duplicates of a radio station and one of the duplicates originated from the partner source, the DSDS may choose to publish the station from the partner source over any other duplicates, even if one or more of the other duplicates has a better audio quality. However, since the content type/bit rate range priorities are set within a source rank, if more than one radio station is a duplicate from the same partner source, the DSDS may publish a radio station with the higher ranking content type/bit rate range priority as established by the content manager. Setting content type and bit rate priorities within a source rank is described further below with regard to FIGS. 8A-8G. After setting content type and bit rate priorities within a source rank, method 300 may continue to 320.

At 320, method 300 may include setting source priorities between a source rank. As described hereinabove, setting source priorities comprises ranking the sources of radio stations so that a radio station from higher ranked source is published over a duplicate of the radio station from a lower ranked source. Accordingly, in a first mode, a first duplicate station in a group of duplicate stations may be published, displayed, and/or otherwise presented responsive to the first duplicate station having a higher ranking (e.g., exceeding publishing/displaying/presenting criteria) than other stations in the group of duplicate stations. During a second mode, a second duplicate station in the group of duplicate stations (e.g., different from the first duplicate station) may be published, displayed, and/or otherwise presented responsive to the second duplicate station having a higher ranking (e.g., exceeding publishing/displaying/presenting criteria) than the first duplicate stations and each of the other stations in the group of duplicate stations. For example, during the first mode, the first duplicate station may have the highest bit rate in the group of duplicate stations, whereas in the second mode, the second duplicate station may have the highest bit rate in the group of duplicate stations. In this way, only one of the duplicate stations may be published, displayed, or otherwise presented.

It is to be understood that the determination of rank may be based on any one or more of the parameters described herein. In some examples, a source may receive a higher ranking based on a contractual agreement. In other examples, a source may receive a higher ranking based on trustworthiness of the source. Setting source priorities is described further below with regard to FIG. 9. After setting source priorities, method 300 may then end.

After establishing the settings for the DSDS, the DSDS may automatically detect duplicate stations during an automated import process and choose at least one station from each group of duplicates to publish to the radio network. In this way, a DSDS may choose the highest quality radio stream from a group of duplicates while simultaneously honoring contractual agreements with sources.

FIG. 4 shows a high-level flow chart illustrating an example method 400 for automatically importing, processing, and publishing internet radio stations in accordance with the current disclosure. Method 400 may be stored as executable instructions in non-transitory memory on electronic device 100.

Method 400 may begin at 405. At 405, method 400 may include importing radio stations. Importing radio stations may comprise retrieving radio station data from a specified set of sources, such as SHOUTCAST, CBS, and so on. After importing radio stations, method 400 may continue to 410. At 410, method 400 may include populating an import database. Populating an import database may comprise, for example, generating rows in a database including information regarding an imported radio station, such as call sign, audio URL, bit rate, and so on. After populating an import database, method 400 may continue to 415.

At 415, method 400 may include validating radio stations. Validating radio stations may comprise, for example, determining that the audio URL is a valid internet radio stream. After validating the imported radio stations, method 400 may continue to 420. At 420, method 400 may include assigning ranks to stations. Assigning ranks to stations may comprise, for example, assigning an integer number to each radio station based on specified default ranks for sources. For example, a trusted source may be given a higher rank (lower number) than an untrusted source. In this way, if both sources include the same radio station, only the station with the higher ranking (that is, from the trusted source) may be published to the radio network. After assigning ranks to stations, method 400 may continue to 425.

At 425, method 400 may include running a duplicate station detection system. Running a duplicate station detection system may comprise, for example, executing the methods 200 and/or 300 described above with regard to FIGS. 2 and 3. After running a duplicate station detection system, method 400 may continue to 430.

At 430, method 400 may include assigning stations with AssignGroup=True to duplicate groups. Stations with a value of true for AssignGroup are marked as being a part of a duplicate group, while stations with a value of false for AssignGroup are marked as not being part of a duplicate group. In this way, duplicate radio stations may be quickly identified. Method 400 may then continue to 435. At 435, method 400 may include assigning ShownInSearchResults value to stations based on, for example, the rank assigned to the radio station. At least one radio station from a duplicate group may be assigned with a ShowInSearchResults=True value, so that at least one radio station from a duplicate group will appear in search results. A station with a true value for ShowInSearchResults indicates that the station will be published to the radio network, while stations with a false value will be suppressed from the radio network. In this way, duplicate stations may be effectively eliminated from the radio network. Method 400 may then continue to 440.

At 440, method 400 may include creating a duplicate detection report. Creating a duplicate detection report may comprise, for example, creating an interface that displays the duplicate stations detected. Creating a duplicate detection report is described further below with regard to FIG. 10. Method 400 may then continue to 445.

At 445, method 400 may include applying manual overrides. Manual overrides may be input by a content manager via, for example, a duplicate detection report interface. Applying manual overrides is described further below with regard to FIG. 10.

At 450, method 400 may include publishing on content type level depending on the station's duplicate group assignment and ranks Publishing on content-type level depending on the station's duplicate group assignment and ranks may comprise publishing the unduplicated radio stations and the specified duplicated radio stations (e.g., those stations manually or automatically set to show in search results based on rank) to a live radio network where users may utilize the aggregated list of radio stations without encountering duplicate radio stations. Method 400 may then end.

Figure 5:
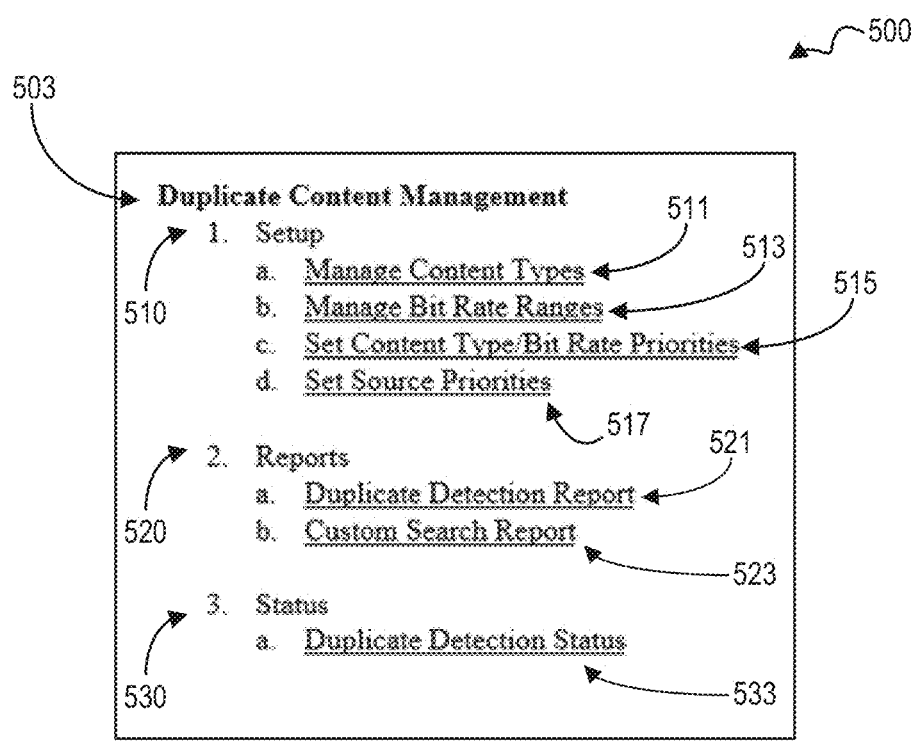
FIG. 5 shows an example interface for duplicate content management.

FIG. 5 shows an example interface 500 of a duplicate station detection tool in accordance with the current disclosure. Interface 500 includes options for setting up the tool, viewing reports, and checking the status of a duplicate station detection process. For example, "Setup" 510 includes items that the content manager interface or device may use to configure how the duplicate detection tool is to be operated. Such items, such as "Manage Content Types" 511, "Manage Bit Rate Ranges" 513, "Set Content Type/Bit Rate Priorities" 515, and "Set Source Priorities" 517, are described further below with regard to FIGS. 6-9. "Reports" 520 includes various views, such as "Duplicate Detection Report" 521 and "Custom Search Report" 523, to inform the content manager interface or device about the results of the duplicate detection (also allowing the content manager to make overrides to the results). An example report view is described further below with regard to FIG. 10, while an example search function and search report are described below with regard to FIGS. 11 and 12. "Status" 530 includes a "Duplicate Detection Status" link 533 to inform the content manager interface or device whether the previous duplicate detection process correctly ran. An example status report is described further below with regard to FIG. 13.

Figure 6A:
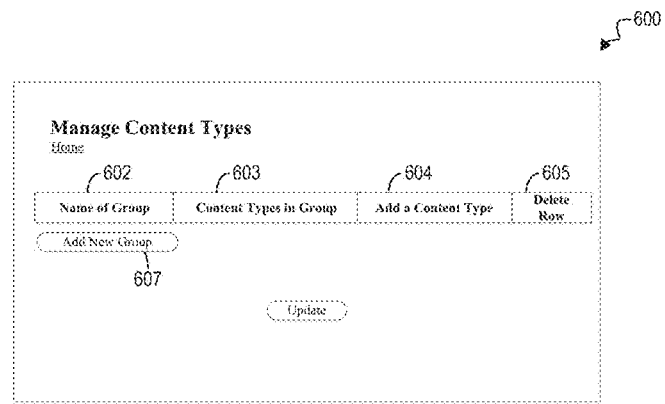
FIGS. 6A-6G show an example interface for managing content types.
Figure 6B:
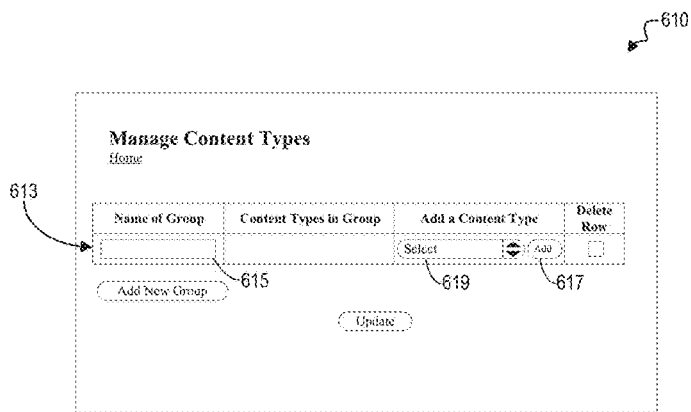

The content manager interface or device may access the "Manage Content Types" interface 600 by clicking on or otherwise selecting the "Manage Content Types" link 511 in the "Duplicate Content Management" section 503 of the import tool interface 500. The "Manage Content Types"

interface 600 may initially resemble the mock-up interface 600 shown in FIG. 6A. Interface 600 includes four columns: "Name of Group" 602, "Content Types in Group" 603, "Add a Content Type" 604, and "Delete Row" 605. Once the content manager interface or device has selected the "Add New Group" button 607, a new row 613 may appear on the table, as shown by the mock-up interface 610 in FIG. 6B. The new table row 613 includes a text field 615 for the content manager to enter the name of the group.

The new table row further includes a drop down menu 619 including all the content types in the database. The content manager may select one of the items and click on or otherwise select the "add" button 617 to add the selected content type to the group, as shown by the mock-up interface 620 in FIG. 6C.

Figure 6C:
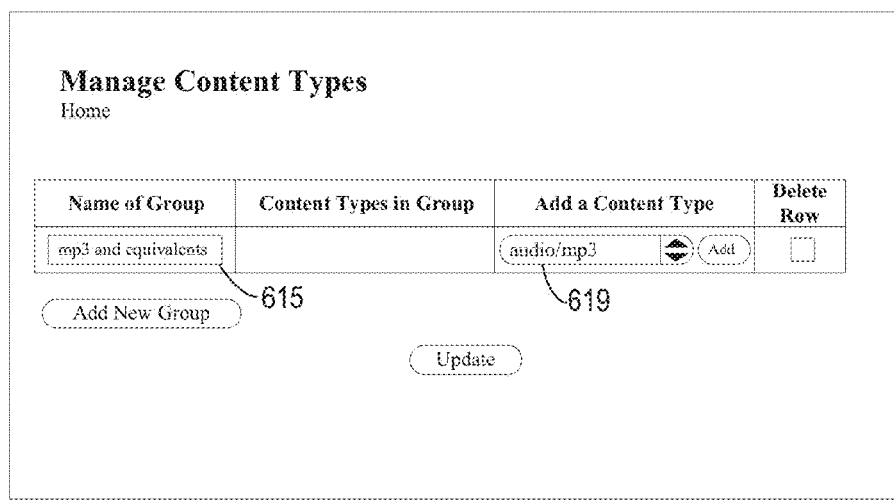

As further shown in FIG. 6C, content types included in the drop down menu 619 may be dynamically populated based on the values present in the database and may be updated every time the page is refreshed. For example, if a new content type is added to the database, the content type drop down menu 619 may automatically reflect this when the page is refreshed.

Figure 6D:
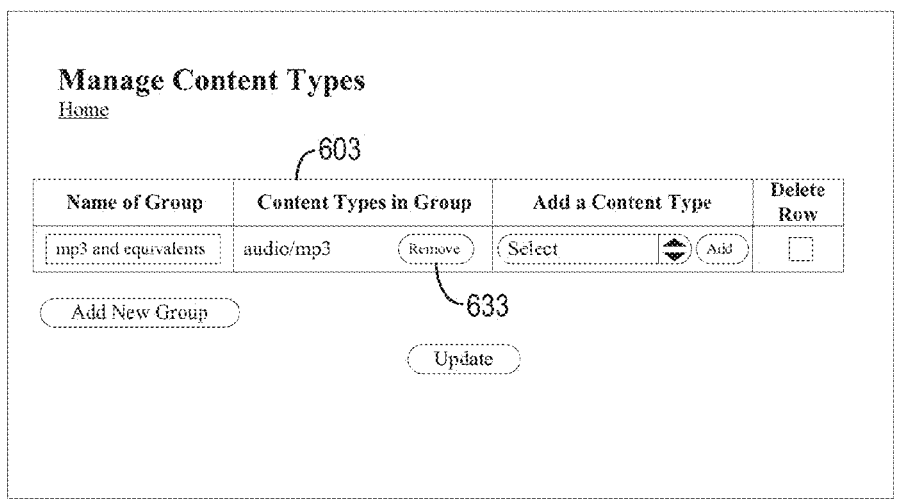
Figure 6E:
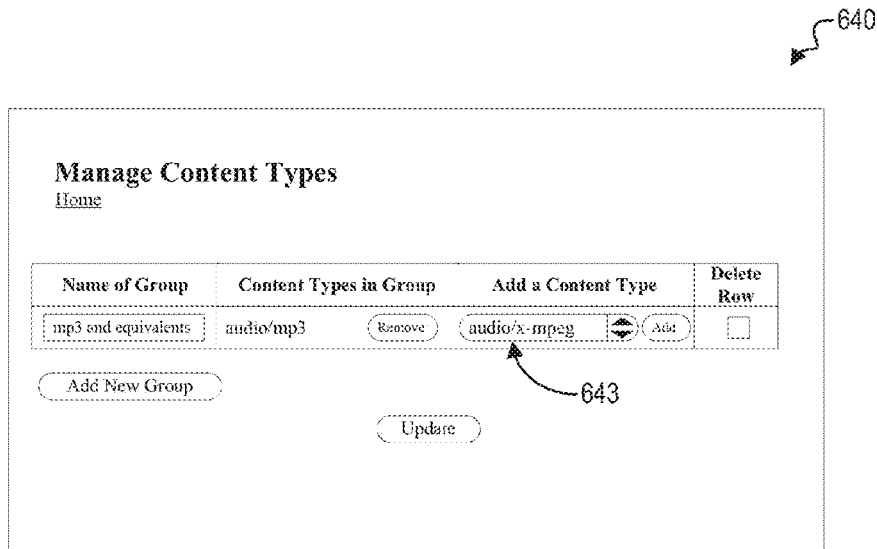

Once a content type has been added to the group, that content type appears in the "Content Types in Group" column 603, along with a "Remove" button 633, as shown by the mock-up interface 630 in FIG. 6D. Another content type 643 may be selected, as shown by the mock-up interface 640 in FIG. 6E. The selected content type may then be added, as shown by 651 of the mock-up interface 650 in FIG. 6F.

Once a content type has been added to a group, that content type is removed from the drop down menu options in the "Add a Content Type" column 604. When the user adds a second new row/group, the content type may also not appear in (e.g., be removed or absent/withheld from) the drop down menu 615 for this second new row/group.

Figure 6F:
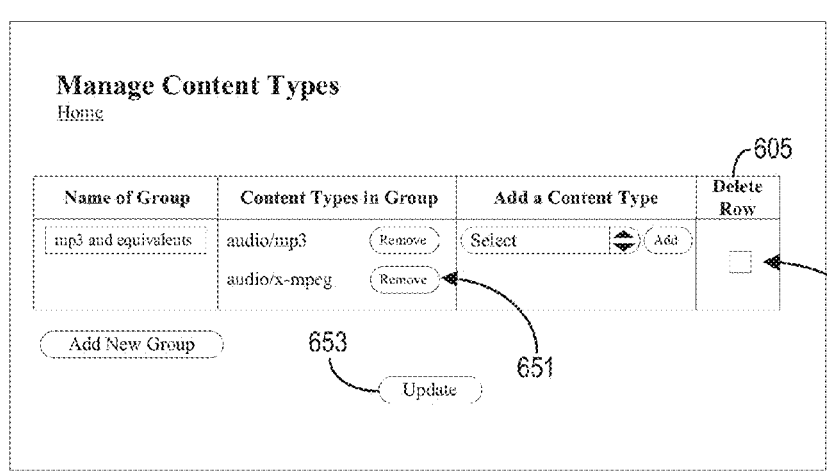

After the content manager is finished adding/removing content types to the group and adding/editing the name of the group, the content manager may click on or otherwise select the "Update" button 653 shown in FIG. 6F to save the changes to the database. If the "Update" button 653 is not selected, the change(s) may not be saved. The content manager may click on or otherwise select a checkbox 659 in "Delete Row" column 605 and then "Update" 653 to delete a content type group.

Figure 6G:
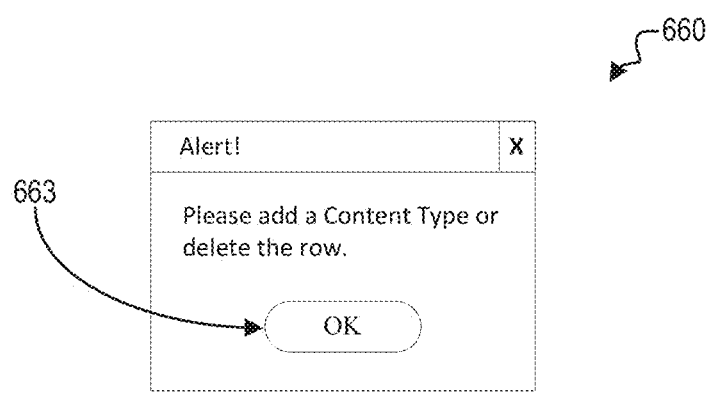

If a row includes no content types, and the "Update" button 653 is selected, a pop-up box 660 may appear as shown in FIG. 6G. Clicking on or otherwise selecting the "OK" button 663 in the pop-up 660 returns the content manager to the "Manage Content Types" interface 650. Data may be persistent when the content manager leaves this page.

The example "Manage Bit Rate Ranges" interface 700 shown in FIG. 7A may allow the content manager interface or device to set the bit rate ranges that may appear in the bit rate drop down menu on the "Set Content Type/Bit Rate Priorities" interface described further below with regard to FIG. 8. The content manager may access the "Manage Bit Rate Ranges" interface 700 by clicking on or otherwise selecting the "Manage Bit Rate Ranges" link 513 in the "Duplicate Content Management" section 503 shown in the import tool interface 500 illustrated in FIG. 5.

Figure 7A:
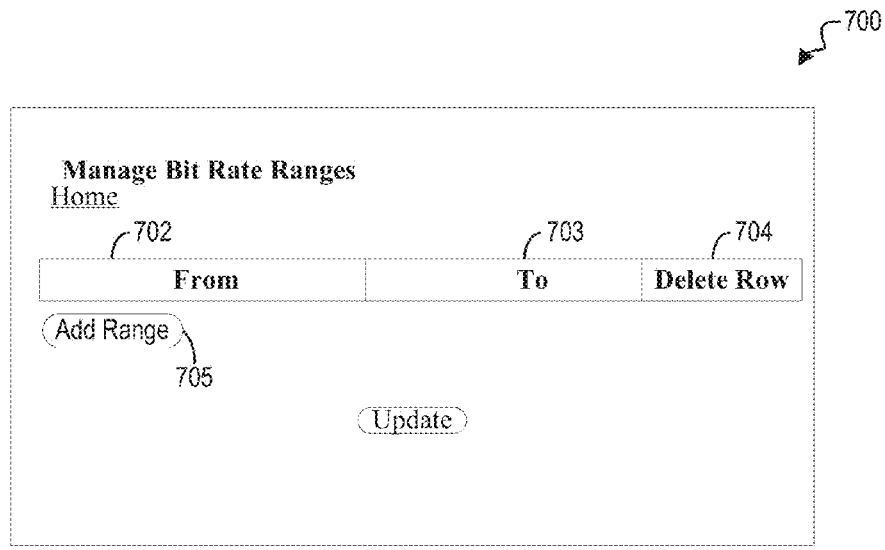
FIGS. 7A-7G show an example interface for managing bit rate ranges.
Figure 7B:
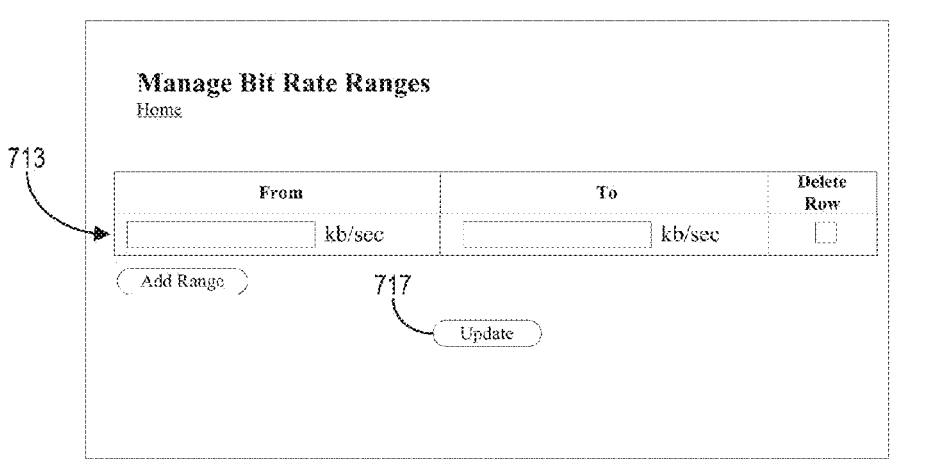
Figure 7C:
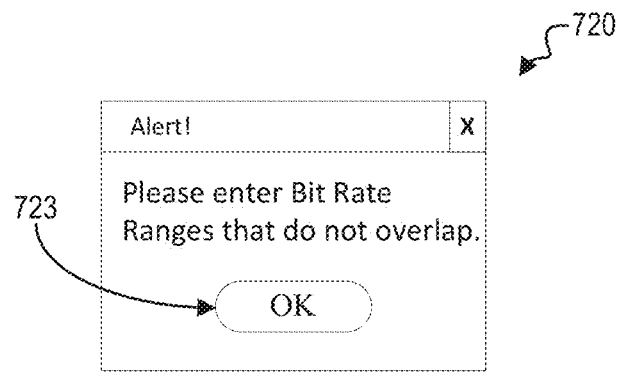
Figure 7D:
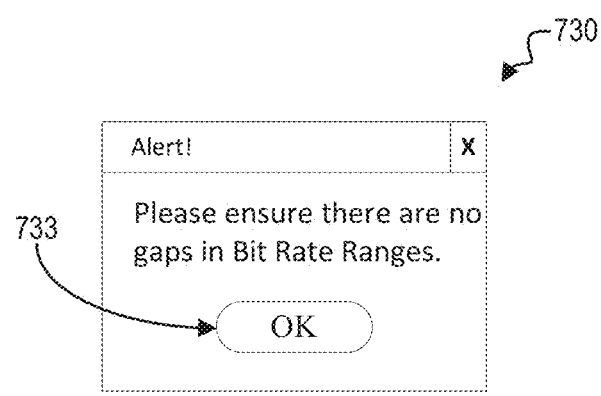

The "Manage Bit Rate Ranges" interface 700 initially resembles the mock-up 700 shown in FIG. 7A. The interface includes three columns, "From" 702 for the beginning of a bit rate range, "To" 703 for the end of a bit rate range, and "Delete Row" 704. Once the content manager selects the "Add Range" button 705, a new row 713 may appear in the table, as shown by mock-up 710 in FIG. 7B. The new row 713 has text fields for the content manager to create a bit rate range by entering in a bit rate value in the "From" field and a bit rate value in the "To" field.

Bit rate ranges may be inclusive of the numbers entered in the "From" and "To" fields. For example, if the range were 12 kb/sec to 24 kb/sec, a piece of content that is 12 kb/sec as well as a piece of content that is 24 kb/sec may be included in this group.

When considering a station's bit rate with regard to which bit rate range the station would fit into, the bit rate may be rounded down. For example, a bit rate of 24.9 kb/sec may round down to 24 kb/sec. If two stations are in the same bit rate range, the station with the earlier "Created On" date and time (not shown) may be used/listed.

The bit rate ranges that the content manager sets up may not overlap. For example, if the range from 12 kb/sec to 24 kb/sec has already been set, the content manager may start with 25 kb/sec as the "From" value for the next range. If the content manager selects the "Update" button and there are overlaps in the bit rate ranges, a pop-up box may appear as seen shown by mock-up 720 in FIG. 7C. Clicking on or otherwise selecting the "OK" button 723 in the pop-up 720 returns the content manager to the "Manage Bit Rate Ranges" interface 700.

There may be no gaps permitted in the bit rate ranges that the content manager sets up, however there may be no defined upper limit. For example, if one range were 0 kb/sec to 25 kb/sec and another range were 30 kb/sec to 45 kb/sec, the gap between 25 kb/sec and 30 kb/sec may be defined as well. If there is a gap and the content manager selects the "Update" button 717, a pop-up box 730 appears as shown by mock-up 730 in FIG. 7D. Clicking on or otherwise selecting the "OK" button 733 returns the content manager to the "Manage Bit Rate Ranges" interface 700.

After the content manager is finished adding bit rate ranges, the content manager may click on or otherwise select the "Update" button 717 to save changes to the database. If the "Update" button 717 is not selected, the change may not be saved.

Figure 7E:
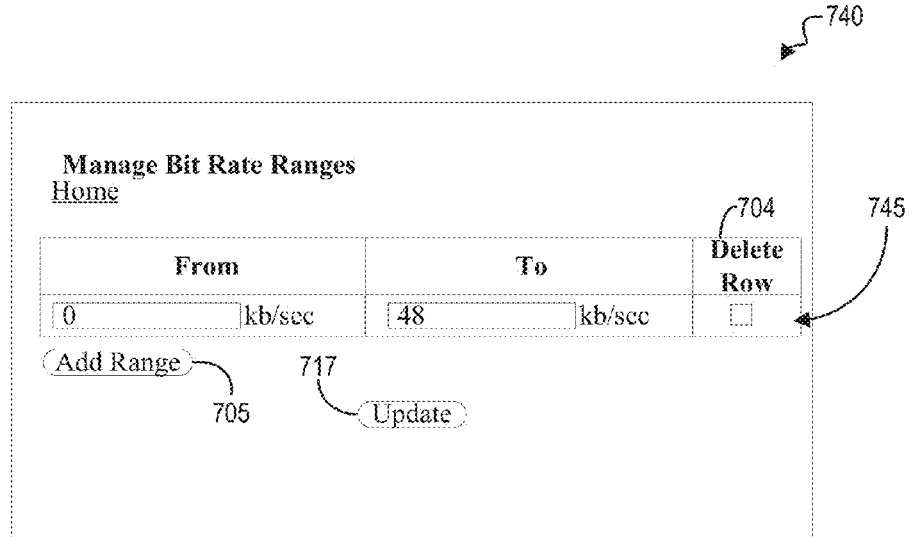
Figure 7F:
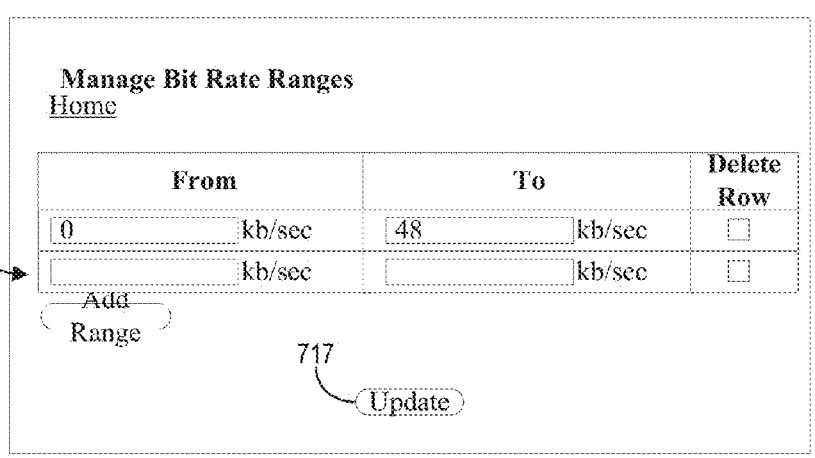

Referring now to the mock-up interface 740 shown in FIG. 7E, the content manager may click on or otherwise select the checkbox 745 in "Delete Row" column 704 and then "Update" button 717 to delete a bit rate range. The content manager may click on or otherwise select "Add Range" 705 to add a second row 753, as shown by mock-up 750 in FIG. 7F.

Figure 7G:
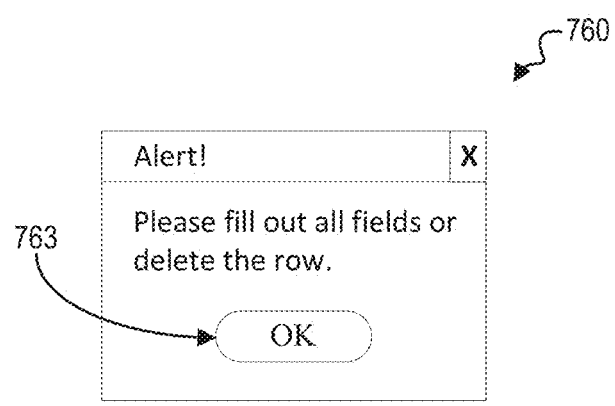

If either the "From" field or the "To" field is left blank when the content manager selects the "Update" button 717, a pop-up box 760 may appear as shown by FIG. 7G. Clicking on or otherwise selecting the "OK" button 763 in the pop-up 760 returns the content manager to the "Manage Bit Rate Ranges" interface 750. Data may be persistent when the content manager leaves this page.

As discussed hereinabove with regard to FIG. 3, in the case that there are duplicate stations within the same source, the "Set Content Type/Bit Rate Priorities" interface 800 shown in FIG. 8A allows the content manager to designate which of those duplicate stations is the primary duplicate for that source. The primary duplicate station may be the station of the best quality as determined by the combination of content type and bit rate. Each source has one primary duplicate station for each group of duplicates. Primaries are a subset of duplicates (all primaries are duplicates, but not all duplicates are primaries). The content type and bit rate may also be used to select the best stream for the user.

The content manager may access the "Set Content Type/ Bit Rate Priorities" interface 800 by selecting the "Set Content Type/Bit Rate Priorities" link 515 in the "Duplicate Content Management" section 503 of the import tool 500 illustrated by FIG. 5. The "Set Content Type/Bit Rate Priorities" interface 800 may initially resemble the mock-up interface 800 shown in FIG. 8A. Mock-up 800 shows zero added rows with four columns: "Content Type Grouping" 802, "Bit Rate Range" 803, "Rank" 804, and "Delete Row" 805.

The content manager may be able to click on or otherwise select an "Add" button 807 to create a new row 813 in the table, as shown by mock-up interface 810 in FIG. 8B. As shown by mock-up interface 820 in FIG. 8C, the items 806 in the drop down menu for "Content Type Grouping" 802 are those previously set up by the content manager on the "Manage Content Types" interface 600, while the items 807 in the drop down menu for "Bit Rate Range" 803 may include a list of bit rate ranges that were previously set up by the content manager on the "Manage Bit Rate Ranges" interface 700. As shown by mock-up interface 830 in FIG. 8D, the content manager may select "Add" button 807 again to add a new row 835.

The content manager is able to enter a "Rank" for each row by entering a numeric value. The content manager may not be able enter the same "Rank" for more than one row in some embodiments. That is, as indicated by the mock-up 830, all values for "Rank" must be different. If the content manager mistakenly enters the same "Rank" for more than one row, when the "Update" button is selected, rather than saving the information, a pop-up 840 may appear as shown by FIG. 8E. Clicking on or otherwise selecting "OK" button 843 on the pop-up 840 may allow the content manager to return to editing the "Set Content Type/Bit Rate Priorities" page.

The content manager may select "Update" button 837 to save changes to the database. If "Update" 837 is not selected, any changes may not be saved. The content manager may delete rows by selecting a checkbox 839 in the "Delete Row" column 805 for the row to be deleted and selecting update.

Figure 8F:
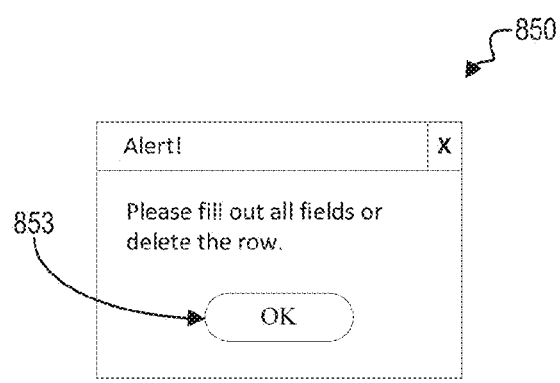

If the content manager selects "Update" button 837 without selecting a value in one or more of the drop down menus or leaving the "Rank" field 804 blank, a pop-up 850 may appear as shown by FIG. 8F. Clicking on or otherwise selecting "OK" button 853 on the pop-up 850 may allow the content manager to return to editing via the "Set Content Type/Bit Rate Priorities" interface 800.

The same set of bit rate ranges may be paired with each content type. In some examples, different sets of bit rate ranges may not be able to be used for different content types. Data may be persistent when the content manager leaves this page.

Gaps may exist in terms of bit rate ranges within one content type. For example, the content manager may set up and rank the following content type grouping/bit rate range combinations: AAC and equivalents, 0-48 kb/sec; AAC and equivalents, 96-120 kb/sec. The content manager may elect not to set up and rank the following content type grouping/ bit rate range, thus creating a gap, and this is acceptable: AAC and equivalents, 49-95 kb/sec. As illustrated herein, the same content type grouping may be used with multiple different bit rate ranges.

Figure 8G:
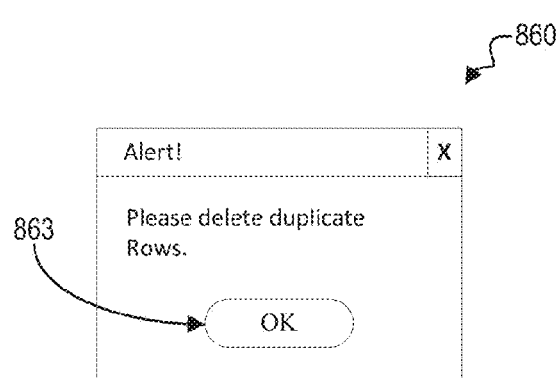

However, the same content type grouping and the same bit rate range combination may not be used more than once. If this were to occur, and the content manager selects the "Update" button 837, a pop-up box 860 may appear with the text "Please delete duplicate rows" as shown by FIG. 8G. Clicking on or otherwise selecting the "OK" button 863 in the pop-up 860 returns the content manager to the "Set Content Type/Bit Rate Ranges" interface 800.

As discussed hereinabove with regard to FIG. 3, in the case that there are duplicate stations between different sources, the "Set Source Priorities" interface allows the content manager to rank sources for the purpose of determining which primary duplicate station for which source may appear in the published radio network, such as the Aha Category Tree. Note that "Aha Category Tree" is used throughout this detailed description to refer to a primary category tree, or primary radio network. Further, the "Set Source Priorities" interface may allow the content manager to set up the default between sources rank for each source, but the content manager may be able to override values on a station-by-station basis in a later section of the tool. Primary duplicate stations for each source may automatically be published to the corresponding partner category tree, if a partner category tree exists for that source. Additionally, by default, the primary duplicate station for all sources with the highest between source ranks may be published to search. The content manager may be able to override this on a station-by-station basis in a later section of the tool.

The content manager may access the "Set Source Priorities" interface 900 by clicking on or otherwise selecting the "Set Source Priorities" link 517 in the "Duplicate Content Management" section 503 of the import tool interface 500 illustrated by FIG. 5.

The "Set Source Priorities" interface may initially resemble the example interface 900 shown in FIG. 9. Each of the current internet radio sources 903 may be listed. If a new internet radio source is added to the radio network, interface 900 may be manually or automatically adjusted to reflect the new internet radio source.

The content manager may be able to rank the list of sources 903 by entering an integer in the "Aha Tree Categorization Rank for Duplicates" field 905. Two or more sources may include the same rank. The content manager may select the "Update" button 913 to save changes. Data may be persistent when the content manager leaves this page 900.

Continuing to FIG. 10, an example duplicate detection report 1000 is shown. Duplicate detection report 1000 allows the content manager to view the results from the most recent time that the duplicate detection process was run. The results may be displayed on a report that allows the content manager to override default values, set up by the content manager as described above, on a station-by-station basis.

The content manager may access the duplicate detection report 1000 by selecting the "Duplicate Detection Report" link 521 in the "Duplicate Content Management" section 503 of the import tool interface 500. Example duplicate detection report 1000 includes three example stations 1010, 1012, and 1014 marked with "Dup. Group ID" 1008 equal to "001." Note that station 1010 does not include location, call signal, or frequency information. However, the station name 1021 for station 1010, "Radio Alice Online," is a partial match for the station name "Alice" for station 1012 and station 1014. Note also that station 1012 and station 1014 have the same call signal 1026 (KLLC), frequency 1027 (97.3 FM), station name 1021 ("Alice"), city 1029 ("San Jose"), and country 1031 ("US"), while station 1012 lists "CA" as a state/province 1034 and station 1014 lists "NY" as a state/province 1034. Content manager may note that the city of San Jose is in California, and that station 1014 includes incorrect state information. The content manager may investigate station 1010 to determine if station 1010 is indeed a duplicate of stations 1012 and 1014. For example, the content manager may check the audio URLs 1028 to determine if there is a match. Duplicate station detection system automatically assigned station 1010 to be published since its source 1022, SHOUTCAST, is ranked higher than the sources 1022 for stations 1012 and 1014. Content manager may use the information displayed by duplicate detection report 1000 to override the automatically assigned values.

Note that only stations that are publishable, valid, and enabled may be displayed in the duplicate detection report 1000. Further, only stations that are duplicates as determined by the duplicate detection tool are displayed in report 1000. Stations that do not have duplicates (that is, unique stations) are not displayed in report 1000.

In some examples, only the first 100 duplicate groups with an unchecked "Reviewed" checkbox 1050 (meaning the content manager has not yet reviewed them) may be shown initially in report 1000. If one station has joined a new group, that station and all stations in that new duplicate group may be shown in the report instead of just the one station. Duplicate stations may be visually grouped together by highlighting every other group in a particular color or otherwise differentiating an appearance of entries for the duplicate stations of one group from other stations. Within the same duplicate group, the stations may be sorted by source rank with, for example, the highest rank (lowest number) shown on top. Within the same duplicate group, if two stations have the same source rank, then the primary duplicate may be shown on top. The rest of the duplicate stations may be sorted by channel ID (lowest to highest). Between different duplicate groups, duplicate groups may be sorted by duplicate group ID, for example from lowest to highest.

A new flag "Assign Group" 1040 may be created for each station to designate whether the station may change groups during duplicate detection (Assign Group=True) or not (Assign Group=False).

Each station may be marked as "Assign Group=True" by default. Content manager may change this default setting by unchecking the box in "Assign Group" column 1040 and selecting "Update" button 1045 to save changes.

If any changes are made by the content manager to the "Assign Group" 1040, "Create New Dup. Group ID" 1020, or some other duplicate group fields, then "Assign Group" 1040 may automatically be unchecked (if not already) for the station, the duplicate group that the station left, and the duplicate group that the station joined.

The content manager may check the "Create New Dup. Group ID" 1020 checkbox and select the "Update" button 1045 to create a new duplicate group with the station selected. Initially, the one station may be the only station in this new duplicate group, until more stations are added.

The station for which a new duplicate group ID was created may essentially be unlinked from the previous duplicate group, and thus the values that the content manager specified in the overrides section 1030 for that station (if any) are cleared, and default values may be followed for that station. However, the duplicate group that lost the station may keep the overridden values. The station in the new group may have "Assign Group" automatically marked as false (that is, unchecked) by default.

The content manager may move a channel from one duplicate group to another by entering in the duplicate group ID that a channel may be moved to in the text field of this column, then selecting the "Update" button 1045. The station that moved to a new duplicate group may essentially be unlinked from the previous duplicate group, and thus the values that the content manager specified in the overrides section 1030 for that station (if any) are cleared, and default values may be followed for that station. However, the duplicate group that lost the station may keep the overridden values. The moved station may have "Assign Group" 1040 automatically marked as false (that is, unchecked). Further, if no stations remain in the previous duplicate group, then that duplicate group is effectively deleted.

As described hereinabove, each station may have a system-generated duplicate group ID number 1008. Duplicates as identified by the system may share the same duplicate group ID 1008. All known values for the "Source" 1022, "Channel ID" 1035, "Country" 1031, "State/Province" 1034, "City" 1029, "Station Name" 1021, "Call Sign" 1026, "Frequency" 1027, "Audio URL" 1028, "Content Type" 1037, and "Bit Rate" 1038 in the table may be pre-populated, and as such these fields may not be editable via report 1000. "Channel ID" 1035 values may be hyperlinks to a "Merge Channel Data" interface associated with the station, as described further herein. "Audio URL" 1028 values may be hyperlinks to the audio URLs.

Duplicate detection report 1000 may include a "Defaults" section 1060. "Defaults" 1060 may include an "Aha Cat. Rank" pre-populated based on settings set in the "Set Source Priorities" interface 900. "Defaults" 1060 may further include an un-editable checkbox for "Show in Search Results" that shows default values checked for stations from sources who have the highest rank in the "Aha Cat. Rank" column; otherwise the default is unchecked. Note that only those stations that have "Show in Search Results" checked may be shown in the search results.

Duplicate detection report 1000 may further include an "Overrides" section 1030 which may include the same columns as the "Default" section 1060. "Overrides" 1030 allows the content manager to edit the default settings. The "Aha Cat. Rank" input field may be initially blank, however the "Show in Search Results" value may be initially pre-populated with the default value. The content manager is able to override any of the values in the "Defaults" section 1060 by entering new values for any of the columns in the "Overrides" section 1030 and selecting the "Update" button 1045 to save the changes.

A new flag "Reviewed" 1050 may be created for each station to designate whether the content manager has reviewed the results of the duplicate detection report for that station or not. "Reviewed" 1050 may initially be defaulted to false, that is, unchecked. The content manager may change the value of "Reviewed" 1050 by checking or unchecking the checkbox. Only the first 100 duplicate groups for which "Reviewed" is unchecked may show up in the results. Once the content manager has reviewed a duplicate group, the content manager may check all the stations in that duplicate group as "Reviewed" so that the content manager does not see that duplicate group again unless something has changed. To see more results, the content manager may mark some duplicate groups as reviewed and select the "Update" button 1045 to refresh the page.

Stations checked as reviewed may no longer appear in the subsequent duplicate detection report results. However, if a station leaves or joins a group that has been previously checked as reviewed, then that station may no longer be checked as reviewed and the station may again appear in the duplicate detection results and custom search results.

If any changes are made by the content manager to the "Assign Group" 1040, "Duplicate Group ID" 1008, or "Assign New Group ID" 1020, then "Reviewed" 1050 may automatically be checked (if not already) for the station, the duplicate group that the station left, and the duplicate group that the station joined. If any changes are made to the "Overrides" section 1030, then "Reviewed" 1050 for that station only may automatically be checked (if not already).

A total count of number of duplicate groups 1090 may be displayed at the top of the page. Further, the content manager has the ability to download all duplicate detection reports in a spreadsheet format, make changes, and re-upload the changes to the web-based version of the report by using, for example, "Download Excel file" button 1095 and "Upload Excel file" button 1096. Even further, the content manager has the ability to return to the previous page by selecting a "Home" button 1099.

Referring now to FIG. 11, a custom search interface 1100 allows a content manager to search for duplicate content using specified search criteria. The result of the search may be a report that allows the content manager to override default values on a station-by-station basis. The content manager may access the "Custom Search" interface 1100 by selecting the "Custom Search Report" link 523 in the "Duplicate Content Management" section 503 of the import tool interface 500.

The "Custom Search" interface may initially resemble the mock-up interface 1100 shown in FIG. 11. "Custom Search" interface 1100 may include two approaches for input by the content manager. One input approach 1105 includes input fields Country and State/Province which respectively accept two-letter codes for country and state/province per international standards. A second input approach 1110 includes text input fields for City, Station Name, Call Sign, Frequency, and Source URL. At least one of the fields in input approach 1110 may be filled in order to perform a custom search. If at least one field is not filled in, a pop-up (not shown) may alert the content manager to enter a search term in at least one of the fields.

The content manager may click on or otherwise select the "Add" button 1117 to create "OR" statements in the custom search. Selecting the "Add" button 1117 may add another set of search criteria fields to the page. The content manager has the ability to return to the previous page by selecting a "Home" button 1199.

Selecting the "Run Report" button 1119 may run duplicate detection based on the criteria entered in "Custom Search" interface 1100. Results of the search may be displayed in a "Custom Search Report" 1200 such as the report 1200 shown in FIG. 12. Note that the interface for "Custom Search Report" 1200 is identical to the interface for the "Duplicate Detection Report" 1000 described herein with regard to FIG. 10, with the exception that the duplicate station results displayed in report 1200 are narrowed to those corresponding to search terms input via "Custom Search" interface 1100. Further, the stations included in report 1200 may be unique stations that are not part of any other duplicate group (that is, a duplicate group of one station). If one station in a duplicate group matches the search criteria, then all stations in that duplicate group are displayed, instead of only the one station that matched the search criteria.

Referring now to FIG. 13, the content manager may access the "Duplicate Detection Status" interface 1300 by selecting the "Duplicate Detection Status" link 533 in the "Duplicate Content Management" section 503 of the import tool interface 500.

The "Duplicate Detection Status" interface 1300 may include a list of previous times that the duplicate detection process was performed. The interface 1300 may further include a list of "Start Time" 1310 and "Finish Times" 1320 for each time duplicate detection was run, as well as the status 1330 for that instance of duplicate detection ("Complete" or "Failed"). If the entire duplicate detection process runs without any issues, the status 1330 may show as "Complete." Otherwise, the status 1330 may comprise a "Failed" value.

In some examples, a new flag for stations, "Assign Rank," may be created. If the content manager interface or device has provided a value in the "Overrides" section 1030 of the duplicate detection report 1000 or the custom search report 1200 for "Aha Cat. Rank," that station may be marked "Assign Rank=False." During an import of radio stations, all publishable, valid, enabled stations with Assign Rank marked as true may be assigned a rank value based on the values specified by the content manager interface or device on the Set Source Priorities interface 900. All publishable, valid, enabled stations with Assign Rank marked as false may be assigned the rank value provided by the content manager interface or device in the "Overrides" section 1030 of the report 1000.

In some examples, duplicate detection may be run across all internet radio sources at a scheduled time set up by the content manager interface or device. Every time duplicate detection is run, all publishable, valid, enabled stations may be compared against each other. As another example of a duplicate station detection method within the same source or between sources, two stations may be considered duplicates if the stations match any one of the below criteria. Matching may be conducted in the order specified below. As soon as either "duplicate" is determined or "not duplicate" is determined, the remaining criteria is not necessarily checked. The result of the duplicate check is binary: match or no match.

An exact match for source URLs returns "duplicate" and may cause duplicate detection to end. Otherwise, detection continues. An exact match for call signs may return "duplicate" and cause detection to end. Otherwise, detection continues. An exact match for station name AND city AND state/province AND country may return "duplicate" when all fields are filled, and cause detection to end. Otherwise, detection continues. As soon as one of the fields does not match, "not duplicate" may be returned and detection may end. Otherwise, detection continues. An exact match for station name AND city AND state/province (country is blank for one or both stations) may return "duplicate" and cause detection to end. As soon as one of the fields does not match, "not duplicate" may be returned and detection may end. Otherwise, detection continues. An exact match for station name AND city AND country (state is blank for one or both stations) may return "duplicate" and cause detection to end. As soon as one of the fields does not match, "not duplicate" may be returned and detection may end. Otherwise, detection continues. An exact match for station name AND city (state/province and/or country are blank for one or both stations) may return "duplicate" and cause detection to end. As soon as one of the fields does not match, "not duplicate" may be returned and detection may end. Otherwise, detection continues. An exact match for station name AND state/province AND country (city is blank for one or both stations) may return "duplicate" and cause detection to end. As soon as one of the fields does not match, "not duplicate" may be returned and detection may end. Otherwise, detection continues. An exact match for station name AND state/province (city and/or country are blank for one or both stations) may return "duplicate" and cause detection to end. As soon as one of the fields does not match, "not duplicate" may be returned and detection may end. Otherwise, detection continues. An exact match for station name AND country (city and/or state/province are blank for one or both stations) may return "duplicate" and cause detection to end. As soon as one of the fields does not match, "not duplicate" may be returned and detection may end. Otherwise, detection continues. An exact match for station name (city and/or state/province and/or country are blank for one or both stations) may return "duplicate" and cause detection to end. As soon as one of the fields does not match, "not duplicate" may be returned and detection may end. Otherwise, there are no duplicates of the station and detection ends.

Source URL matching may encompass all of the following: audio URL (same as current definition of audio URL in the database); PLS audio URL (the URL(s) from a PLS file); and resolved audio URL (the URL that the HTTP client would resolve to if redirected). Source URL matching may be conducted in the following order. First, check if audio URLs are an exact match with each other or with any other source URL within the system. If so, assume it is a match and there is no need to check any further. Second, check if at least one URL within a PLS file is an exact match with any other source URL within the system. If so, assume it is a match and there is no need to check any further. URLs found within the PLS files may be stored individually in the system, and associated with that station. Third, check if the resolved URL is exactly the same as any other source URLs within the system. If so, assume it is a match and there is no need to check any further. Then store the resolved URL and its association with that station so that further matches may be more easily found.

In some examples, a new flag for stations "Assign Group" may be created. Initially, "Assign Group" may be defaulted to true for all stations. Stations identified as duplicates by the DSDS may be assigned the same system-generated Duplicate Group ID number. Stations without duplicates may be in a Duplicate Group of one and assigned a unique Duplicate Group ID number.

Stations that the content manager interface or device marks Assign Group=False (either through the Duplicate Detection Report 1000 or the Custom Search Report 1200) may not be assigned to a different Duplicate Group on subsequent times that duplicate detection is run. However, another station may join the Duplicate Group even if stations in that Duplicate Group are marked as Assign Group=False.

After duplicates are determined, stations marked as Assign Group=True may join any Duplicate Group or be reassigned to a different Duplicate Group. However, stations that the content manager interface or device has marked as Assign Group=False may not leave their Duplicate Group.

Overrides to either Rank or ShowInSearchResults made by the content manager interface or device may remain with the Duplicate Group even if one of the stations leaves the Duplicate Group or another station joins the Duplicate Group. A station that has been unlinked from a Duplicate Group may have any overrides for that station cleared, and use default values instead.

By default the ShowInSearchResults may be true for all stations in each Duplicate Group with the highest Rank as specified by the content manager interface or device on the "Set Source Priorities" interface 900. ShowInSearchResults may be false for the remaining stations in each Duplicate Group. If the content manager interface or device has overridden the ShowInSearchResults value, then the override value may be honored. Any changes made may be reflected immediately without a server restart or server refresh.

FIG. 14 shows a high-level flow chart illustrating an example method 1400 for assigning a station to a duplicate group in accordance with the current disclosure. Method 1400 may be stored as executable instructions in non-transitory memory on electronic device 100. Note that steps within the dashed line are particularly high level and thus may vary.

Method 1400 may begin at 1405. At 1405, method 1400 may include evaluating a radio station. For example, evaluating a radio station may comprise populating an import database with information regarding the radio station, or may comprise gathering information regarding the radio station stored in an import database or elsewhere.

Continuing to 1410, method 1400 may include determining if the station is set to enabled, publish, and valid. If a station is set to enabled, publish, and valid, then the station is eligible for publishing. If the station is not set to enabled, publish, and valid, then method 1400 continues to 1415 where the station information is maintained and method 1400 ends. Returning to 1410, if the station is set to enabled, publish, and valid, then method 1400 continues to 1420.

At 1420, method 1400 may include assigning a rank to the station. As described hereinabove, assigning a rank to the station may be based on values specified by the content manager interface or device on the "Set Source Priorities" interface 900 of FIG. 9. Continuing to 1425, method 1400 may include determining if Assign Group equals true for the station. If Assign Group is true, then method 1400 may continue to 1430. At 1430, method 1400 may include determining if the station is a duplicate as described hereinabove. If the station is a duplicate, then method 1400 continues to 1435. At 1435, the station may be assigned to an existing duplicate group. Method 1400 then ends.

Returning to 1425 and 1430, if Assign Group is false for the station or the station is determined to not have a duplicate, then method 1400 continues to 1440. At 1440, method 1400 may include determining if the station has a group. If the station has a group, then method 1400 continues to 1445 where the station is maintained, or unchanged, and method 1400 ends. If the station does not have a group, then method 1400 continues to 1450. At 1450, method 1400 may include assigning the station to a new group. Assigning the station to a new group may comprise marking the station with a unique system-generated Duplicate Group ID. Method 1400 may then end.

Due to the changes introduced by the duplicate detection process, some aspects of the publish process may be changed as well. For example, publishing may occur on a content type level and be based on a schedule set by the content manager interface or device. Publishing may still occur on a station-by-station basis, but duplicate detection may not be run in some examples. Once duplicates have been identified by the duplicate station detection system, the publish process determines which duplicate is published where. Such a publish process is described further herein with regard to FIG. 15.

FIG. 15 shows a high-level flow chart illustrating an example method 1500 for determining where a radio station may be published. Method 1500 may be stored as executable instructions in non-transitory memory on electronic device 100. Method 1500 may begin at 1505. At 1505, method 1500 may include evaluating the station. For example, evaluating a radio station may comprise populating an import database with information regarding the radio station, or may comprise gathering information regarding the radio station stored in an import database or elsewhere.

Continuing to 1510, method 1500 may include determining if the station is set to enabled, publish, and valid. If not, method 1500 continues to 1515 where the station is maintained, or unchanged. Method 1500 then ends. If the station is set to enabled, publish, and valid, then method 1500 may continue to 1520.

At 1520, method 1500 may include determining if the station is the only station within its duplicate group. If the station is the only station within its group, then method 1500 continues to 1525 where the station is eligible for publishing to, for example, the Aha Category Tree, the Partner Category Tree, and Search. Note that the Aha Category Tree represents the primary radio network, the Partner Category Tree represents a partner radio network, and Search represents a search database accessible by users. Method 1500 may then end.

Returning to 1520, if the station is not the only station within its group, method 1500 may continue to 1530. At 1530, method 1500 may include determining if the duplicate group includes stations from the same source. If so, method 1500 may continue to 1535 where method 1500 may include determining if the rank within the source is tied. If so, method 1500 may continue to 1540. At 1540, method 1500 may include determining if the station has an earlier create date, that is, if the station was created before the other duplicate station. If the station does not have an earlier create date, then method 1500 may continue to 1545 where the station is marked as do not publish. Method 1500 then ends.

Returning to 1535 and 1540, if the rank within the source is not tied or the station does have an earlier create date, then method 1500 proceeds to 1550. At 1550, method 1500 may include determining if the station has the highest rank within its source. If not, then method 1500 continues to 1545 where the station is marked as do not publish, and method 1500 ends. If the station does have the highest rank within its source, method 1500 continues to 1555. At 1555, the station is at least eligible for publishing to the Partner Category Tree.

Continuing to 1560, method 1500 may include determining if the group includes stations from other sources. If the group does not include stations from other sources, then method 1500 continues to 1565 where the station is further eligible for publishing to the Aha Category Tree and Search. Method 1500 then ends.

If the group does include stations from other sources, then method 1500 continues to 1570. At 1570, method 1500 may include determining if the source is the highest ranked source in the group. If so, then method 1500 continues to 1565 where the station is eligible for publishing to Aha Category Tree and Search. Method 1500 then ends. Otherwise, method 1500 continues to 1575 where the station is marked as eligible to be published to Aha Category Tree and Search. Method 1500 then ends.

Hence, during a content-type publish process, if there are duplicate stations within the same source, the primary duplicate station for that source is the station that embodies the content type/bit rate combination with the highest content type/bit rate priority rank. During a content type publish process, any overrides made by the content manager interface or device to Aha Category Rank or ShowInSearchResults may be taken into account.

Furthermore, during a content type publish process, if there are duplicate stations between different sources, by default, the source with the highest source priority rank (lower number) may have its primary duplicate station categorized in the Aha Category Tree, over the primary duplicate of any other source with a lower rank (higher number). Additionally, by default, only sources with the highest rank may have their stations show up in search results.

Note that in some examples, two or more sources may have the same source priority rank. If two or more sources have the same source priority rank which happens to be the highest rank amongst the other duplicate stations, then the primary duplicate station for all sources with the highest rank is published in the Aha Category Tree and shows up in search results unless overridden by the content manager.

If a source has no rank, but other sources are ranked, then the sources with rank values may be considered higher ranked than sources with no rank values. If none of the sources have ranks, then all primary duplicates are published in the Aha Category Tree and Search. In some examples, during a content type publish process, primary duplicate stations for each source may automatically be published to the corresponding Partner Category Tree, if a Partner Category Tree exists for that source.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as electronic computing device 100 described with reference to FIG. 1. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" is to be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
   identifying, with a processor, stations within a radio station network;
   determining, with the processor, which of the stations are duplicate stations, wherein each station is identified by a plurality of properties, and wherein determining which of the stations are duplicate stations comprises:
   assigning a duplicate group number to a station responsive to at least one property of the plurality of properties of the station listed in one or more property maps of a plurality of property maps;
   otherwise assigning a new duplicate group number to the station; and updating the plurality of property maps with the plurality of properties of the station;
selecting, with the processor, automatically or responsive to user input directed to the processor, which of the duplicate stations to show and which of the duplicate stations to suppress from being presented to a user; and
selectively displaying, with the processor, a selected duplicate station of a group of duplicate stations depending on contractual agreements between the radio station network and one or more partners.

2. The method of claim 1, wherein selectively displaying the selected duplicate station of the group of duplicate stations comprises ranking the duplicate stations.

3. The method of claim 2, wherein ranking the duplicate stations comprises ranking content types.

4. The method of claim 2, wherein ranking the duplicate stations comprises ranking bit rates.

5. The method of claim 2, wherein ranking the duplicate stations comprises ranking sources of the duplicate stations.

6. The method of claim 2, wherein selectively displaying the selected duplicate station of the group of duplicate stations comprises displaying the selected duplicate station and not displaying other duplicate stations in the group of duplicate stations when the selected duplicate station ranks higher than the other duplicate stations in the group of duplicate stations.

7. A method for identifying duplicate stations within a radio station network, the method comprising:
comparing, with a processor, a station within the radio station network to previously compared stations;
responsive to a property of the station not matching a property listed in a property map corresponding to a station of the previously compared stations, assigning, with the processor, to the station a new identification number and updating the property map to include the property of the station;
responsive to the property of the station matching at least one property listed in the property map corresponding to at least one station of the previously compared stations, assigning, with the processor, to the station an identification number previously assigned to the at least one station of the previously compared stations;
determining, with the processor, a ranking of each duplicate station in a group of duplicate stations;
during a first mode, displaying, with the processor, a first duplicate station of the group of duplicate stations responsive to the first duplicate station having a higher ranking than other stations in the group of duplicate stations; and
during a second mode, displaying, with the processor, a second duplicate station of the group of duplicate stations responsive to the second duplicate station having a higher ranking than the first duplicate station and the other stations in the group of duplicate stations.

8. The method of claim 7, wherein determining the ranking of each duplicate station in the group of duplicate stations comprises ranking content types.

9. The method of claim 7, wherein determining the ranking of each duplicate station in the group of duplicate stations comprises ranking bit rates.

10. The method of claim 7, wherein determining the ranking of each duplicate station in the group of duplicate stations comprises ranking sources of the duplicate stations.

11. The method of claim 7, wherein determining the ranking of each duplicate station in the group of duplicate stations comprises ranking a create date of each duplicate station.

12. The method of claim 7, further comprising displaying a list of duplicate stations and selectively displaying duplicate stations in the list based on user input.

13. The method of claim 7, wherein determining the ranking of each duplicate station in the group of duplicate stations comprises setting a rank of selected duplicate stations based on an override value specified by user input.

14. A system, comprising:
a processor; and
a non-transitory computer readable medium storing instructions executable by the processor to:
identify stations within a radio station network;
determine which of the stations are duplicate stations, wherein each station is identified by a plurality of properties, and wherein determining which of the stations are duplicate stations comprises assigning a duplicate group number to a station based on whether at least one property of the plurality of properties of the station is listed in one or more property maps of a plurality of property maps;
select, via automated operated content management devices or user input directed to manually operated content management devices, which of the duplicate stations to show and which of the duplicate stations to suppress from being presented to a user; and
selectively present a selected duplicate station of a group of duplicate stations depending on contractual agreements between the radio station network and one or more partners.

15. The system of claim 14, wherein identifying the duplicate stations within the radio station network comprises comparing a station within the radio station network to previously compared stations, responsive to the station not matching any station of the previously compared stations, assigning to the station a new identification number, and responsive to the station matching at least one station of the previously compared stations, assigning to the station an identification number previously assigned to the at least one station of the previously compared stations.

16. The system of claim 15, wherein selectively presenting the selected duplicate station of the group of duplicate stations comprises ranking the duplicate stations.

17. The system of claim 16, wherein ranking the duplicate stations comprises ranking one or more of content types, bit rates, and sources of the duplicate stations.

18. The system of claim 17, wherein selectively displaying the selected duplicate station of the group of duplicate stations comprises displaying the selected duplicate station and not displaying other duplicate stations in the group of duplicate stations when the selected duplicate station ranks higher than the other duplicate stations in the group of duplicate stations.

19. The system of claim 17, wherein selectively displaying the selected duplicate station of the group of duplicate stations comprises displaying the selected duplicate station and not displaying other duplicate stations in the group of duplicate stations when the selected duplicate station has an earlier create date than the other duplicate stations in the group of duplicate stations and has a same rank as the other duplicate stations in the group of duplicate stations.

20. The system of claim 16, wherein ranking the duplicate stations in the group of duplicate stations comprises setting a rank of selected duplicate stations based on an override value specified by user input.

* * * * *